(12) United States Patent
Stylianou et al.

(10) Patent No.: US 9,683,776 B2
(45) Date of Patent: Jun. 20, 2017

(54) SYSTEMS AND METHODS FOR SEPARATING HYDROCARBONS USING ONE OR MORE DIVIDING WALL COLUMNS

(75) Inventors: Elena Stylianou, Greenford (GB); Myrian Andrea Schenk, London (GB)

(73) Assignee: Kellogg Brown & Root LLC, Houston, TX (US)

( * ) Notice: Subject to any disclaimer, the term of this patent is extended or adjusted under 35 U.S.C. 154(b) by 661 days.

(21) Appl. No.: 13/397,921

(22) Filed: Feb. 16, 2012

(65) Prior Publication Data
US 2013/0213088 A1 Aug. 22, 2013

(51) Int. Cl.
F25J 3/00 (2006.01)
F25J 1/00 (2006.01)
(Continued)

(52) U.S. Cl.
CPC ............ *F25J 1/0022* (2013.01); *B01D 3/141* (2013.01); *B01D 3/143* (2013.01); *C10L 3/101* (2013.01); *C10L 3/12* (2013.01); *F25J 1/025* (2013.01); *F25J 1/0212* (2013.01); *F25J 1/0216* (2013.01); *F25J 1/0278* (2013.01); *F25J 3/0209* (2013.01); *F25J 3/0233* (2013.01); *F25J 3/0238* (2013.01); *F25J 3/0242* (2013.01); *F25J 3/0247* (2013.01); *F25J 2200/02* (2013.01); *F25J 2200/94* (2013.01); *F25J 2200/96* (2013.01); *F25J 2215/62* (2013.01); *F25J 2215/64* (2013.01); *F25J 2215/66* (2013.01); *F25J 2290/72* (2013.01)

(58) Field of Classification Search
CPC ........ F25J 3/0233; F25J 3/0209; F25J 3/0238; F25J 3/0247; F25J 3/0242; F25J 3/04933; F25J 3/04945; F25J 3/04939

USPC ................................... 62/618, 619, 620, 624
See application file for complete search history.

(56) References Cited

U.S. PATENT DOCUMENTS 2,471,134 A * 5/1949 Wright ..................... B01D 3/14
196/100
4,357,153 A 11/1982 Erickson
(Continued)

FOREIGN PATENT DOCUMENTS

WO 2010059386 A1 5/2010

*Primary Examiner* — Frantz Jules
*Assistant Examiner* — Brian King
(74) *Attorney, Agent, or Firm* — Gary Machetta

(57) ABSTRACT

Methods and systems for separating hydrocarbons using one or more dividing wall columns are provided. The method can include introducing a hydrocarbon fluid to a first dividing wall column. A first overhead comprising methane, ethane, or a combination thereof, a first intermediate comprising ethane, a second intermediate comprising ethane, and a first bottoms comprising one or more hydrocarbons having three or more carbon atoms per molecule can be recovered from the first dividing wall column. The first overhead can be introduced to a process for producing a liquefied natural gas. The first bottoms can be introduced to a second dividing wall column. A second overhead comprising propane, a third intermediate comprising butane, and a second bottoms comprising one or more hydrocarbons having five or more carbon atoms per molecule can be recovered from the second dividing wall column. The second overhead can be introduced to the process for producing a liquefied natural gas.

13 Claims, 5 Drawing Sheets

(51) Int. Cl.
    *B01D 3/14*    (2006.01)
    *F25J 1/02*    (2006.01)
    *F25J 3/02*    (2006.01)
    *C10L 3/10*    (2006.01)
    *C10L 3/12*    (2006.01)

(56) References Cited

U.S. PATENT DOCUMENTS

| | | |
|---|---|---|
| 4,496,786 A | 1/1985 | Santilli et al. |
| 4,541,943 A | 9/1985 | Powell |
| 4,550,217 A | 10/1985 | Graziani et al. |
| 4,590,320 A | 5/1986 | Sapre |
| 4,626,321 A | 12/1986 | Grethlein et al. |
| 4,695,349 A | 9/1987 | Becker et al. |
| 5,191,141 A | 3/1993 | Barger et al. |
| 5,755,933 A | 5/1998 | Ognisty et al. |
| 5,914,012 A | 6/1999 | Kaibel et al. |
| 5,935,388 A | 8/1999 | Meszaros |
| 5,970,742 A * | 10/1999 | Agrawal et al. ............... 62/630 |
| 6,077,985 A * | 6/2000 | Stork ............................. 585/800 |
| 6,182,469 B1 * | 2/2001 | Campbell .............. F25J 3/0209 62/621 |
| 6,250,106 B1 * | 6/2001 | Agrawal ........................ 62/643 |
| 6,347,533 B1 | 2/2002 | Tung |
| 6,397,630 B1 * | 6/2002 | Fraysse ................... F16K 25/04 236/92 B |
| 6,589,395 B1 | 7/2003 | Meili |
| 6,645,350 B1 | 11/2003 | Steacy |
| 6,958,111 B2 | 10/2005 | Rust et al. |
| 7,005,057 B1 | 2/2006 | Kalnes |
| 7,038,097 B2 | 5/2006 | Molinier et al. |
| 7,090,748 B2 | 8/2006 | Kaibel et al. |
| 7,216,507 B2 * | 5/2007 | Cuellar .................. F25J 3/0214 62/620 |
| 7,264,696 B2 | 9/2007 | Kaibel et al. |
| 7,266,948 B2 | 9/2007 | Spoelstra |
| 7,301,063 B2 | 11/2007 | Choi et al. |
| 2010/0108487 A1 | 5/2010 | Townsend |
| 2010/0329946 A1 * | 12/2010 | Mehlberg ...................... 422/198 |
| 2011/0036120 A1 * | 2/2011 | Jager ........................ C10L 3/10 62/611 |

\* cited by examiner

SYSTEMS AND METHODS FOR SEPARATING HYDROCARBONS USING ONE OR MORE DIVIDING WALL COLUMNS

BACKGROUND

Field

Embodiments described generally relate to systems and methods for separating hydrocarbons using one or more dividing wall columns. More particularly, such embodiments relate to systems and methods for separating hydrocarbons using one or more dividing wall columns for use in a process for producing liquefied natural gas.

Description of the Related Art

Natural gas can be liquefied to facilitate its transportation. Prior to liquefaction, raw natural gas must generally be treated to remove components which can freeze and plug equipment during the formation and/or processing of liquefied natural gas (LNG). For example, water, carbon dioxide, and heavier hydrocarbon components containing five or more carbon atoms are generally removed.

It has typically also been desirable to fractionate natural gas into its various hydrocarbon components. Ethane, propane, and butane (C2-C4) are commonly used as refrigerants for natural gas liquefaction in the so-called multi-component or mixed refrigeration processes. Pentanes and heavier hydrocarbons generally have greater economic value as natural gas liquids (NGLs) or condensate for use in chemical feedstocks and gasoline. Fractionation processes typically involve cooling the natural gas to effect a partial condensation and feeding the partially condensed stream to a fractionation column commonly known as a scrub column. Methane can be taken primarily in the overhead vapor and heavier components can be removed primarily as a bottoms liquid. The bottoms are usually fractionated further into individual C2-C4 component products and a C5+ product. One or more of the C2-C4 products can be supplied as a makeup gas or liquid in the LNG refrigeration system (e.g., multi-component or mixed) and/or in order to make a liquefied petroleum gas (LPG) product. Typically, the scrub column employs an overhead reflux that, e.g., can be supplemented by a butane wash.

The mixed refrigerant (MR) process can be commonly employed in onshore LNG plants around the world. The MR process generally requires a continual supply of light hydrocarbons, e.g., methane, ethane, propane, isobutane, normal butane, isopentane, and normal pentane in order to function effectively and efficiently. These light hydrocarbons are typically distilled from the LNG plant feed gas in the fractionation section of the LNG train. The feed gas can be cooled as it passes through the LNG train and, once the feed gas reaches a low enough temperature, the light hydrocarbons condense from the gas stream. These hydrocarbons are then directed to the fractionation section, which can be a series of fractionation columns where each of the light hydrocarbons can be recovered as a single relatively pure component. These single components can be directed into the MR process, diverted to storage for future use, and/or directed back to the feed gas.

In a fractionation train of an LNG facility utilizing a mixed refrigerant (MR) process, for example, a propane mixed refrigerant (C3MR) process or a dual mixed refrigerant process (DMR), a typical C3MR or DMR fractionation unit can be generally required to produce ethane, propane, butane, and pentane refrigerants downstream of the scrub column. For example, the C3MR process generally includes a propane refrigerant cycle followed by a mixed refrigerant cycle where the mixed refrigerant includes methane, ethane, and propane. Also for example, a DMR process generally includes a first mixed refrigerant cycle where the mixed refrigerant includes methane, ethane, propane, butane, and pentane, followed by a second mixed refrigerant cycle where the mixed refrigerant includes methane, ethane, and propane. The fractionation column, e.g., a scrub column, fractionates a raw natural gas to provide a natural gas product and a hydrocarbon fluid having multiple components such as methane, ethane, propane, butane and components having five or more carbon atoms per molecule. Currently, the conventional C3MR and DMR fractionation units require three to six fractionation columns. For example, a conventional C3MR fractionation unit can include five columns including a scrub column, demethanizer, deethanizer, depropanizer, and debutanizer or, when utilizing a reboiler on the scrub column, can include four columns, i.e., the same five columns minus the demethanizer. Also for example, a conventional DMR fractionation unit can include six columns including a scrub column, demethanizer, deethanizer, depropanizer, debutanizer, and depentanizer or, when utilizing a reboiler on the scrub column, can include five columns, i.e., the same six columns minus the demethanizer. These multiple fractionation units can require significant capital costs to construct and operate, can require a large area of plot space, and due to the number of columns can require an increased number of personnel to operate that can also increase the potential for injuries.

There is a need, therefore, for improved systems and methods for separating a hydrocarbon fluid having multiple components to produce one or more hydrocarbons for use, e.g., during the production of a liquefied natural gas.

DETAILED DESCRIPTION

Figure 1:
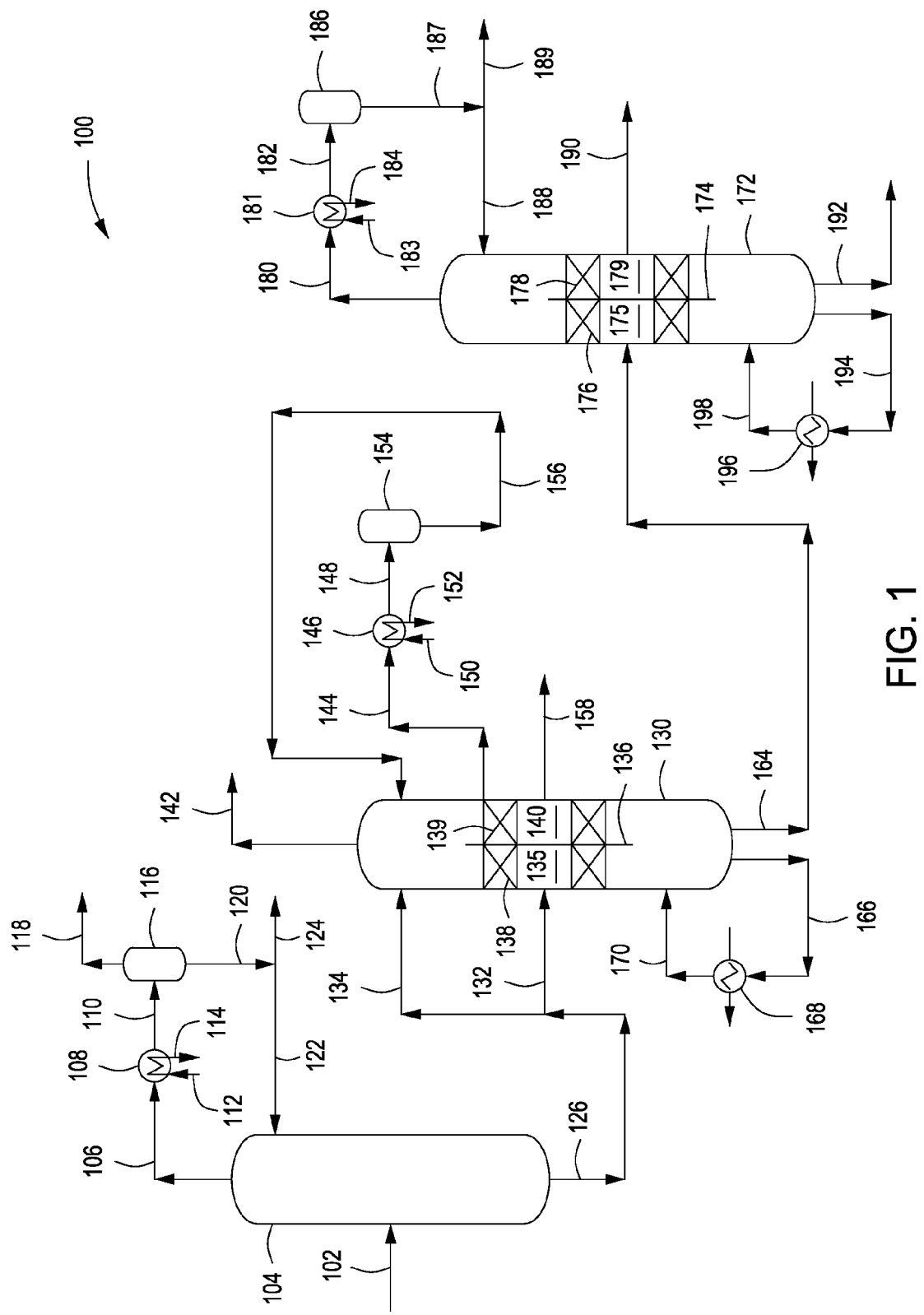
FIG. 1 depicts an illustrative system for separating hydrocarbons for use in a process for producing a liquefied natural gas using two dividing wall columns, according to one or more embodiments described.

Systems and methods for separating one or more hydrocarbons using one or more dividing wall columns are provided. A hydrocarbon fluid can be introduced to a dividing wall column. An overhead can be recovered from the dividing wall column and introduced to a process for producing a liquefied natural gas. For example, the method can include introducing a hydrocarbon fluid to a first dividing wall column. A first overhead comprising methane, ethane, or a combination thereof, a first intermediate comprising ethane, a second intermediate comprising ethane, and a first bottoms comprising one or more hydrocarbons having three or more carbon atoms per molecule can be recovered from the first dividing wall column. The first overhead can be introduced to a process for producing a liquefied natural gas. The first bottoms can be introduced to a second dividing wall column. A second overhead comprising propane, a third intermediate comprising butane, and a second bottoms comprising one or more hydrocarbons having five or more carbon atoms per molecule can be recovered from the second dividing wall column. The second overhead can be introduced to the process for producing a liquefied natural gas.

A propane mixed refrigerant (C3MR) fractionation unit and/or a dual mixed refrigerant (DMR) fractionation unit can include one or more dividing wall columns. The C3MR fractionation unit and/or the DMR fractionation unit can also include one or more fractionation columns. One or more of the fractionation columns can be located before or upstream of the one or more dividing wall columns.

As used herein, the terms "fractionation column" and "column" refer to any system, device, or combination of systems and/or devices suitable for the selective separation of a mixture containing two or more components having differing boiling points. Such fractionation columns or columns can include, but are not limited to, dividing wall columns, scrub columns, distillation columns, rectification columns, and stripping columns. As used herein, the term "dividing wall column" refers to any column having a dividing wall. As used herein, the term "dividing wall" refers to any partition disposed within an interior of a column to provide a first fractionation zone on one side of the dividing wall and a second fractionation zone on the other side of the dividing wall. The dividing wall can be either segmented or continuous. The dividing wall can be parallel or non-parallel relative to a longitudinal axis of the column. The first fractionation zone and the second fractionation zone can have the same or different cross-sectional areas, volumes, or both. The column can have a circular cross-section and the dividing wall can bisect the cross-section of the column to provide equal cross-sectional areas within the first fractionation zone and the second fractionation zone. The dividing wall can extend completely or only partially from one side of the dividing wall column to the other side of the dividing wall column.

The C3MR fractionation unit can be arranged or configured in any desired manner. For example, in a C3MR fractionation unit that includes two dividing wall columns, a hydrocarbon fluid can be introduced to the first dividing wall column. The first dividing wall column can produce a first overhead including methane, ethane, or a combination thereof, a first intermediate including ethane that can be used, e.g., as reflux, a second intermediate including ethane, and a first bottoms including one or more hydrocarbons having three or more carbon atoms per molecule. The first dividing wall column can be in fluid communication with the second dividing wall column. For example, the first bottoms recovered from the first dividing wall column can be introduced to the second dividing wall column. The second dividing wall column can produce a second overhead including propane, a third intermediate including butane, and a second bottoms including one or more hydrocarbons having five or more carbon atoms per molecule. The C3MR fractionation unit can also include one or more fractionation columns, with or without a reboiler, located before or upstream of the first dividing wall column. A hydrocarbon feed can be introduced to the fractionation column. A fractionation column overhead including methane can be recovered from the fractionation column. A fractionation column bottoms that includes the hydrocarbon fluid can also be recovered from the fractionation column. The fractionation column can be in fluid communication with the first dividing wall column. For example, the bottoms recovered from the fractionation column can be introduced to the first dividing wall column. As used herein, the term "butane" can refer to both normal butane and isobutane. As used herein, the term "pentane" can refer to both normal pentane and isopentane. As used herein, the term "overhead" can include vapor. As used herein, the term "bottoms" can include liquid.

In another example, in a C3MR fractionation unit that includes two dividing wall columns, a hydrocarbon fluid can be introduced to the first dividing wall column. The first dividing wall column can produce a first overhead including methane, a first intermediate including one or more hydrocarbons having two to four carbon atoms per molecule that can be used, e.g., as reflux, a second intermediate including one or more hydrocarbons having two to four carbon atoms per molecule, and a first bottoms including one or more hydrocarbons having five or more carbon atoms per molecule. The first dividing wall column can be in fluid communication with the second dividing wall column. For example, the second intermediate recovered from the first dividing wall column can be introduced to the second dividing wall column. The second dividing wall column can produce a second overhead including ethane, a third intermediate including propane, and a second bottoms including butane. The C3MR fractionation unit can also include one or more fractionation columns, with or without a reboiler, located before or upstream of the first dividing wall column. A hydrocarbon feed can be introduced to the fractionation column. A fractionation column overhead including methane can be recovered from the fractionation column. A fractionation column bottoms that includes the hydrocarbon fluid can also be recovered from the fractionation column. The fractionation column can be in fluid communication with the first dividing wall column. For example, the bottoms recovered from the fractionation column can be introduced to the first dividing wall column.

In an example C3MR fractionation unit that includes two dividing wall columns, the hydrocarbon feed to the fractionation column can be expanded to produce an expanded hydrocarbon feed. The fractionation column overhead including methane can be compressed to provide a compressed fractionation column overhead. The fractionation column overhead or the compressed fractionation column overhead can be introduced as a gas product to a pipeline. The energy recovered from the expanding can provide at least a portion of the energy required for the compressing.

Another example C3MR fractionation unit can include a dividing wall column, a first fractionation column, and a second fractionation column. A hydrocarbon fluid can be introduced to the dividing wall column. The dividing wall column can produce an overhead including propane, an intermediate including butane, and a bottoms including one or more hydrocarbons having five or more carbon atoms per molecule. The a first fractionation column, with or without a reboiler, can be located before or upstream of the dividing wall column. A first hydrocarbon fluid can be introduced to the first fractionation column. The first fractionation column can produce a first fractionation column overhead including methane, ethane, or a combination thereof and a first fractionation column bottoms including the hydrocarbon fluid. The first fractionation column can be in fluid communication with the dividing wall column. For example, the bottoms recovered from the first fractionation column can be introduced to the dividing wall column. The second fractionation column, with or without a reboiler, can be located before or upstream of the first fractionation column. A hydrocarbon feed can be introduced to the second fractionation column. The second fractionation column overhead including methane can be recovered from the second fractionation column. The second fractionation column bottoms that includes the first hydrocarbon fluid can also be recovered from the second fractionation column. The second fractionation column can be in fluid communication with the first fractionation column. For example, the bottoms recovered from the second fractionation column can be introduced to the first fractionation column.

In an example C3MR fractionation unit that includes one dividing wall column, the hydrocarbon feed to the first fractionation column can be expanded to produce an expanded hydrocarbon feed. The first fractionation column overhead including methane can be compressed to provide a compressed first fractionation column overhead. The first fractionation column overhead or the compressed first fractionation column overhead can be introduced as a gas product to a pipeline. The energy recovered from the expanding can provide at least a portion of the energy required for the compressing.

The methane, ethane, propane, and/or butane can be recovered as separate components and/or as mixtures thereof in the C3MR fractionation process. The recovered methane, ethane, propane, butane, and/or a combination thereof can be introduced to a process for producing a liquefied natural gas, for example, for use as a refrigerant in a natural gas liquefaction process and/or for use as a feedstock in a natural gas liquefaction process and/or for storage for future use.

The DMR fractionation unit can be arranged or configured in any desired manner. For example, in a DMR fractionation unit that includes two dividing wall columns, a hydrocarbon fluid can be introduced to the first dividing wall column. The first dividing wall column can produce a first overhead including methane, ethane, or a combination thereof, a first intermediate including propane, and a first bottoms including one or more hydrocarbons having four or more carbon atoms per molecule. The first dividing wall column can be in fluid communication with the second dividing wall column. For example, the first bottoms recovered from the first dividing wall column can be introduced to the second dividing wall column. The second dividing wall column can produce a second overhead including butane, a second intermediate including pentane, and a second bottoms including one or more hydrocarbons having six or more carbon atoms per molecule. The DMR fractionation unit can also include one or more fractionation columns, with or without a reboiler, located before or upstream of the first dividing wall column. A hydrocarbon feed can be introduced to the fractionation column. A fractionation column overhead including methane can be recovered from the fractionation column. A fractionation column bottoms that includes the hydrocarbon fluid can also be recovered from the fractionation column. The fractionation column can be in fluid communication with the first dividing wall column. For example, the bottoms recovered from the fractionation column can be introduced to the first dividing wall column.

Another example DMR fractionation unit can include two dividing wall columns, a first fractionation column, and a second fractionation column. A hydrocarbon fluid can be introduced to the first dividing wall column. The first dividing wall column can produce a first overhead including ethane, a first intermediate including propane, and a first bottoms including one or more hydrocarbons having four or more carbon atoms per molecule. The first dividing wall column can be in fluid communication with the second dividing wall column. For example, the bottoms recovered from the first dividing wall column can be introduced to the second dividing wall column. The second dividing wall column can produce an overhead including butane, a second intermediate including pentane, and a bottoms including one or more hydrocarbons having six or more carbon atoms per molecule. The DMR fractionation unit can also include one or more fractionation columns, with or without a reboiler, located before or upstreamn of the first dividing wall column. For example, a first hydrocarbon fluid can be introduced to the first fractionation column. An overhead including methane, ethane, or a combination thereof can be recovered from the first fractionation column. A bottoms that includes the hydrocarbon fluid can be recovered from the first fractionation column. The first fractionation column can be in fluid communication with the first dividing wall column. For example, the bottoms recovered from the first fractionation column can be introduced to the first dividing wall column. The second fractionation column, with or without a reboiler, can be located before or upstream of the first fractionation column. A hydrocarbon feed can be introduced to the second fractionation column. An overhead including methane can be recovered from the second fractionation column. A bottoms that includes the first hydrocarbon fluid can also be recovered from the second fractionation column. The second fractionation column can be in fluid communication with the first fractionation column. For example, the bottoms recovered from the second fractionation column can be introduced to the first fractionation column.

In an example DMR fractionation unit, the hydrocarbon feed to the fractionation column can be expanded to produce an expanded hydrocarbon feed. The fractionation column overhead including methane can be compressed to provide a compressed fractionation column overhead. The fractionation column overhead or the compressed fractionation column overhead can be introduced as a gas product to a pipeline. The energy recovered from the expanding can provide at least a portion of the energy required for the compressing. In another example DMR fractionation unit, the hydrocarbon feed to the first fractionation column can be expanded to produce an expanded hydrocarbon feed. The first fractionation column overhead including methane can be compressed to provide a compressed first fractionation column overhead. The first fractionation column overhead or the compressed first fractionation column overhead can be introduced as a gas product to a pipeline. The energy recovered from the expanding can provide at least a portion of the energy required for the compressing.

The methane, ethane, propane, butane, and/or pentane can be recovered as separate components and/or as mixtures thereof in the DMR fractionation process. The recovered methane, ethane, propane, butane, pentane, and/or a combination thereof can be introduced to a process for producing a liquefied natural gas, for example, for use as a refrigerant in a natural gas liquefaction process and/or for use as a feedstock in a natural gas liquefaction process and/or for storage for future use.

Systems and methods for separating hydrocarbons using one or more dividing wall columns can produce hydrocarbon components using less equipment as compared to conventional systems and methods. Using less equipment can provide for lower capital and maintenance costs. Using less equipment can also be a safety advantage due to a lower requirement for operators and maintenance personnel to be present in the fractionation unit areas as well as a reduced hydrocarbon inventory and a reduced plot space requirement. Reduced plot space requirement for refrigerant production can be especially beneficial in constrained sites or for adding additional fractionation capacity in existing sites. Saving space can also be particularly important if the systems and methods are applied offshore, for example on floating liquefied natural gas (FLNG) facilities, where weight and utilized space have to be kept within strict limits. The systems and methods can be applied onshore, offshore, or a combination thereof.

Systems and methods for separating hydrocarbons using one or more dividing wall columns can also provide for one or more additional advantages. Energy consumption for the fractionation unit can be lower than conventional fractionation and can be further reduced by optimizing column configuration for specific operating parameters. Reduced capital expenditure for a new liquefaction plant can be achieved. Operational flexibility can be provided so that varying the operation of the one or more dividing wall columns can vary the purity and quantity of the hydrocarbon components produced. A lower hydrocarbon inventory can be provided as the result of a fewer number of fractionation columns, vessels, and ancillary equipment. A high refrigerant production rate capability can be provided that can also lead to a reduced refrigerant storage requirement. Operator exposure can be reduced as a result of lower equipment count. Reducing the equipment count can provide for reducing the weight of the overall process that can be especially cost-effective in a floating facility. A dividing wall column configuration can be well-suited to application or retrofit in LNG plants with fractionation occurring downstream of, e.g., a natural gas liquids (NGL) module with an expander/compressor system.

In a dividing wall column, a dividing wall can be located within the column. The dividing wall typically extends some distance above and below the side feed entry point of the column. On the side of the dividing wall opposite to the feed introduction point at least one intermediate product side draw can be located. The dividing wall prevents the lateral mixing of the feed and the fraction removed via the intermediate product side draw on the opposite side of the dividing wall. The fraction removed via the intermediate product side draw advantageously has a higher concentration of lower boiling point components than similar fractionation or distillation columns operated without the dividing wall. Exemplary dividing wall columns are described in U.S. Pat. Nos. 2,471,134; 5,755,933; 5,914,012; 6,347,533; 6,645,350; and 6,958,111.

The one or more fractionation columns and the one or more dividing wall columns can include a shell or housing disposed at any angle, in any configuration, and/or having any length to diameter (L/D) ratio. For clarity and ease of description, the one or more fractionation columns and the one or more dividing wall columns will be further described with reference to a vertical, cylindrical, column having an L/D ratio of greater than 1.

The shell or housing of the column can define two or more sections or volumes therein. For example, three sections can be included, namely a top ("rectification") section, an intermediate ("fractionating") section, and a bottom ("stripping") section. The fractionating section can be disposed between the rectification section and the stripping section, with each section in fluid communication with one another.

The fractionating section can be divided by a dividing wall disposed within the fractionation section. The dividing wall can provide two independent fractionation zones within the fractionating section, namely, a first fractionation zone and a second fractionation zone. The dividing wall can be disposed within the fractionating section such that the first fractionation zone and the second fractionation zone are of equal or unequal cross-sectional area. For example, the dividing wall can bisect the cross-section of the fractionation section such that the first fractionation zone and the second fractionation zone are of equal cross-sectional area.

The dividing wall can be a continuous or a segmented wall, baffle, or divider. The dividing wall can be non-insulated, partially insulated, or completely insulated. The dividing wall can be parallel with a longitudinal axis of the column, non-parallel with a longitudinal axis of the column, or a combination thereof.

The one or more fractionation columns and the one or more dividing wall columns, for example, the first fractionation zone and the second fractionation zone of a dividing wall column, can be empty, partially filled, or completely filled with one or more trays and/or packing materials to improve mass transfer and/or separation of a hydrocarbon fluid and/or feed. The fill material and fill pattern in the one or more fractionation columns and the one or more dividing wall columns, for example, in the first fractionation zone and the second fractionation zone of a dividing wall column, can be the same or different. For example, the fill material in the one or more fractionation columns can include one or more structured and/or random packed materials while the fill material in the one or more dividing wall columns can include one or more trays. Also for example, the fill material in the one or more fractionation columns can include one or more trays while the fill material in the one or more dividing wall columns can include one or more structured and/or random packed materials. Also for example, the fill material in the first fractionation zone of a dividing wall column can include one or more structured and/or random packed materials while the fill material in the second fractionation zone of the dividing wall column can include one or more trays. Also for example, the fill material in the first fractionation zone of a dividing wall column can include one or more trays while the fill material in the second fractionation zone of the dividing wall column can include one or more structured and/or random packed materials. Two or more types of fill material can be disposed in the one or more fractionation columns and the one or more dividing wall columns, for example, within the first fractionation zone and/or the second fractionation zone. For example, the fractionation zone of a fractionation column or the first fractionation zone of a dividing wall column can contain random dumped packing beneath a feed introduction line or column inlet and one or more trays above the column inlet. One or more chimney trays or other liquid trap-out device can be disposed in the fractionation zone of a fractionation column or the second fractionation zone of a dividing wall column to improve or aid in the withdrawal of a product.

For example, when the systems and methods for separating hydrocarbons are conducted onshore, the one or more fractionation columns and/or the one or more dividing wall columns can be filled with trays and/or packing materials. Also for example, when systems and methods for separating hydrocarbons are conducted offshore, the one or more fractionation columns and/or the one or more dividing wall columns can be filled with packing materials. Due to the generally continuous movement of offshore units, packing materials can be more effective than rigid trays.

As used herein, the term "trays" can include, but is not limited to, one or more types of trays that can improve the contact between gas and liquid phases within the column. Illustrative trays can include, but are not limited to perforated trays, sieve trays, bubble cap trays, floating valve trays, fixed valve trays, tunnel trays, cartridge trays, dual flow trays, baffle trays, shower deck trays, disc and donut trays, orbit trays, horse shoe trays, cartridge trays, snap-in valve trays, chimney trays, slit trays, or any combination thereof.

As used herein, the term "packing material" can include, but is not limited to, one or more types of structured and/or random shaped material disposed within the column. The packing material can increase the effective surface area within the column, which can improve the mass transfer between liquid and gas phases within the column. The packing material can be made of any suitable material, for example metals, non-metals, polymers, ceramics, glasses, or any combination thereof. Illustrative examples of random packing material can include, but are not limited to, Raschig rings, Lessing rings, I-rings, saddle rings, Intalox saddles, Tellerettes, Pall rings, U-rings, or any combination thereof. Illustrative examples of commercially available structured packing can include, but are not limited to, structured packing, corrugated sheets, crimped sheets, gauzes, grids, wire mesh, monolith honeycomb structures, or any combination thereof. For example, suitable structured packing can include FLEXIPAC and GEMPAK structured packing manufactured by the Koch-Glitsch Corporation.

The column can be made of one or more metallic and/or non-metallic materials physically and chemically compatible with the temperature, pressure, and contents of the column. Suitable metallic materials can include, but are not limited to, ferrous alloys including carbon and stainless steels, and non-ferrous alloys such as aluminum, nickel, HASTELLOY, INCONEL, INCALLOY, tantalum, and the like.

The stripping section can be empty, partially filled, or completely filled with one or more trays and/or packing. One or more fluid connections can be disposed in, on, or about the stripping section for circulating fluids within the stripping section to/from one or more heat exchange zones.

The fractionation zone of the one or more fractionation columns and the first fractionation zone and the second fractionation zone of the one or more dividing wall columns can be in fluid communication at a second end with the rectification section. The rectification section can be empty, partially filled, or completely filled with one or more trays and/or packing. One or more fluid connections can be disposed in, on, or about the rectification section for the introduction of an external reflux to the rectification section and the removal of a product from the rectification section.

The one or more columns can be operated at a temperature ranging from a low of about −200° C., about −100° C., about −50° C., about 0° C., or about 50° C. to a high of about 100° C., or about 300° C. The one or more columns can be operated at a pressure ranging from a low of about 50 kPa, about 75 kPa, about 100 kPa, about 200 kPa, or about 300 kPa to a high of about 400 kPa, about 600 kPa, about 900 kPa, about 1,200 kPa, about 1,500 kPa, about 2,000 kPa, about 3,000 kPa, about 4,000 kPa, about 5,000 kPa, about 6,000 kPa, or about 7,000 kPa.

The sections of each column can be operated at different temperatures. For example, the rectification section can be operated at a temperature lower than the fractionation zone, or the first fractionation zone and the second fractionation zone of a dividing wall column, and the stripping section. The fractionation zone, or the first fractionation zone, and the rectification section can be operated at the same temperature or about the same temperature, for example within 10° C., which can be lower than the second fractionation zone and the stripping zone. The fractionation zone or the second fractionation zone can be operated at a temperature greater than the rectification section and the first fractionation zone, but at a temperature less than the stripping section. The stripping section can be operated at a temperature greater than the rectification section, the fractionation zone, the first fractionation zone, and the second fractionation zone. A greater temperature variation between the first fractionation zone and the second fractionation zone can be provided, at least in part, by an at least partially insulated dividing wall.

The rectification section can be operated at a first temperature ("$T_1$"), the fractionation zone or the first fractionation zone can be operated at a second temperature ("$T_2$"), the second fractionation zone can be operated at a third temperature ("$T_3$"), and the stripping section can be operated at a fourth temperature ("$T_4$"). $T_1$ can be less than $T_2$, $T_2$ can be less than or greater than $T_3$, and $T_3$ can be less than $T_4$. The temperature between $T_1$ and $T_2$ can differ by less than about 50° C., less than about 30° C., less than about 15° C., less than about 10° C., less than about 5° C., or less than about 1° C. $T_3$ can be greater than $T_1$ and greater or less than $T_2$, but less than $T_4$. $T_3$ can be about 5° C., about 10° C., about 15° C., about 30° C., about 50° C. or more, greater than $T_2$ and/or $T_1$. $T_3$ can be about 5° C., about 10° C., about 15° C., about 30° C., about 50° C. or more, less than $T_2$. $T_4$ can be about 5° C., about 10° C., about 15° C., about 30° C., about 50° C. or more, greater than $T_3$.

A hydrocarbon fluid can be introduced to the one or more dividing wall columns and/or the one or more fractionation columns. Examples of suitable hydrocarbon fluids can include, but are not limited to, hydrocarbon compounds containing any combination and/or amount of hydrocarbons containing one to twenty carbon atoms per molecule (C1-C20 hydrocarbons). Other hydrocarbon fluids can include mixtures containing hydrocarbons, e.g., C1-C20 hydrocarbons, nitrogen, hydrogen, oxygen, argon, helium, or any mixture thereof. The hydrocarbon fluid can include about 80 mol %, about 90 mol %, about 95 mol %, about 97 mol %, about 98 mol %, about 99 mol %, or about 99.5 mol % or more of a single component, e.g., methane. The hydrocarbon fluid that can be introduced to the one or more dividing wall columns can be a dividing wall column bottoms from a dividing wall column that can be located before or upstream of the one or more dividing wall columns. The hydrocarbon fluid that can be introduced to the one or more dividing wall columns can be a fractionation column bottoms from a fractionation column that can be located before or upstream of the one or more dividing wall columns. The hydrocarbon fluid (also referred to as a "first hydrocarbon fluid") that can be introduced to the one or more fractionation columns can be a first fractionation column bottoms from a first fractionation column that can be located before or upstream of the one or more fractionation columns.

A hydrocarbon feed can be introduced to the one or more dividing wall columns and/or the one or more fractionation columns. Examples of a suitable hydrocarbon feed can include, but are not limited to, hydrocarbon compounds containing any combination and/or amount of hydrocarbons containing one to twenty carbon atoms per molecule (C1-C20 hydrocarbons). Other hydrocarbon feeds can include mixtures containing hydrocarbons, e.g., C1-C20 hydrocarbons, nitrogen, hydrogen, oxygen, argon, helium, or any mixture thereof. The hydrocarbon feed can include about 80 mol %, about 90 mol %, about 95 mol %, about 97 mol %, about 98 mol %, about 99 mol %, or about 99.5 mol % or more of a single component, e.g., methane. The hydrocarbon feed that can be introduced to the one or more dividing wall columns and/or the one or more fractionation columns can be a treated natural gas stream.

The mass flow rate of the hydrocarbon fluid and/or the hydrocarbon feed introduced to the one or more dividing wall columns and/or the one or more fractionation columns can range from a low of about 1,000 kilograms per hour (kg/hr), about 100,000 kg/hr, about 150,000 kg/hr, about 200,000 kg/hr, about 250,000 kg/hr, or about 300,000 kg/hr to a high of about 800,000 kg/hr, about 850,000 kg/hr, about 900,000 kg/hr, about 950,000 kg/hr, or about 1,000,000 kg/hr.

A dividing wall column overhead can include about 50 mol %, about 60 mol %, about 70 mol %, about 80 mol %, about 90 mol %, about 95 mol %, about 97 mol %, about 98 mol %, about 99 mol %, or about 99.5 mol % or more of a single component of a fractionation column bottoms, hydrocarbon fluid, and/or hydrocarbon feed introduced to the dividing wall column. A first dividing wall column overhead can include about 50 mol %, about 60 mol %, about 70 mol %, about 80 mol %, about 90 mol %, about 95 mol %, about 97 mol %, about 98 mol %, about 99 mol %, or about 99.5 mol % or more of a single component of a fractionation column bottoms, hydrocarbon fluid, and/or hydrocarbon feed introduced to the first dividing wall column. A second dividing wall column overhead can include about 50 mol %, about 60 mol %, about 70 mol %, about 80 mol %, about 90 mol %, about 95 mol %, about 97 mol %, about 98 mol %, about 99 mol %, or about 99.5 mol % or more of a single component of a first dividing wall column bottoms, one or more first dividing wall column intermediates, hydrocarbon fluid, and/or hydrocarbon fluid, and/or hydrocarbon feed introduced to the second dividing wall column. A fractionation column overhead can include about 50 mol %, about 60 mol %, about 70 mol %, about 80 mol %, about 90 mol %, about 95 mol %, about 97 mol %, about 98 mol %, about 99 mol %, or about 99.5 mol % or more of a single component of a first fractionation column bottoms, first hydrocarbon fluid, hydrocarbon fluid, and/or hydrocarbon feed introduced to the fractionation column. A first fractionation column overhead can include about 50 mol %, about 60 mol %, about 70 mol %, about 80 mol %, about 90 mol %, about 95 mol %, about 97 mol %, about 98 mol %, about 99 mol %, or about 99.5 mol % or more of a single component of a hydrocarbon fluid and/or hydrocarbon feed introduced to the first fractionation column.

A dividing wall column intermediate can include about 20 mol %, about 30 mol %, about 40 mol %, about 50 mol %, about 60 mol %, about 70 mol %, about 80 mol %, about 90 mol %, about 95 mol % or more, about 97 mol % or more, about 98 mol % or more, about 99 mol % or more, or about 99.5 mol % or more of a single component of a fractionation column bottoms, hydrocarbon fluid, and/or hydrocarbon feed introduced to the dividing wall column. A first dividing wall column first intermediate can include about 20 mol %, about 30 mol %, about 40 mol %, about 50 mol %, about 60 mol %, about 70 mol %, about 80 mol %, about 90 mol %, about 95 mol %, about 97 mol %, about 98 mol %, about 99 mol %, or about 99.5 mol % or more of a single component of a fractionation column bottoms, hydrocarbon fluid, and/or hydrocarbon feed introduced to the first dividing wall column. A first dividing wall column second intermediate can include about 20 mol %, about 30 mol %, about 40 mol %, about 50 mol %, about 60 mol %, about 70 mol %, about 80 mol %, about 90 mol %, about 95 mol %, about 97 mol %, about 98 mol %, about 99 mol %, or about 99.5 mol % or more of a single component of a fractionation column bottoms, hydrocarbon fluid, and/or hydrocarbon feed introduced to the first dividing wall column. A second dividing wall column intermediate (also referred to as a second or third intermediate when preceded by a first dividing wall column) can include about 20 mol %, about 30 mol %, about 40 mol %, about 50 mol %, about 60 mol %, about 70 mol %, about 80 mol %, about 90 mol %, about 95 mol %, about 97 mol %, about 98 mol %, about 99 mol %, or about 99.5 mol % or more of a single component of a first dividing wall column bottoms, one or more first dividing wall column intermediates, hydrocarbon fluid, and/or hydrocarbon feed.

The dividing wall column intermediate can have a boiling point greater than the dividing wall column overhead. The first dividing wall column first and/or second intermediate can have a boiling point greater than the first dividing wall column overhead. The second dividing wall column intermediate can have a boiling point greater than the second dividing wall column overhead.

A dividing wall column bottoms can include the balance of a fractionation column bottoms, hydrocarbon fluid, and/or hydrocarbon feed introduced to the dividing wall column. The first dividing wall column bottoms can include the balance of a fractionation column bottoms, hydrocarbon fluid, and/or hydrocarbon feed introduced to the first dividing wall column. A second dividing wall column bottoms can include the balance of a first dividing wall column bottoms, one or more first dividing wall column intermediates, hydrocarbon fluid, and/or hydrocarbon feed introduced to the second dividing wall column. A fractionation column bottoms can include the balance of a first fractionation column bottoms, hydrocarbon fluid, and/or hydrocarbon feed introduced to the fractionation column. A first fractionation column bottoms can include the balance of a hydrocarbon fluid and/or hydrocarbon feed introduced to the first fractionation column. The dividing wall column bottoms can have a boiling point greater than the dividing wall column overhead and/or the dividing wall column intermediate. The first dividing wall column bottoms can have a boiling point greater than the first dividing wall column overhead, the first dividing wall column first intermediate, and/or the first dividing wall column second intermediate. The second dividing wall column bottoms can have a boiling point greater than the second dividing wall column overhead and/or the second dividing wall column intermediate. The fractionation column bottoms can have a boiling point greater than the fractionation column overhead. The first fractionation column bottoms can have a boiling point greater than the first fractionation column overhead.

A dividing wall column bottoms can be a fully purified product having up to about 90 mol %, about 95 mol %, about 97 mol %, about 98 mol %, about 99 mol %, or about 99.5 mol % or more of a single component of a fractionation column bottoms, hydrocarbon fluid, and/or hydrocarbon feed introduced to the dividing wall column. A first dividing wall column bottoms can be a fully purified product having up to about 90 mol %, about 95 mol %, about 97 mol %, about 98 mol %, about 99 mol %, or about 99.5 mol % or more of a single component of a fractionation column bottoms, hydrocarbon fluid, and/or hydrocarbon feed introduced to the first dividing wall column. A second dividing wall column bottoms can be a fully purified product having up to about 90 mol %, about 95 mol %, about 97 mol %, about 98 mol %, about 99 mol %, or about 99.5 mol % or more of a single component of a first dividing wall column bottoms, one or more first dividing wall column intermediates, hydrocarbon fluid, and/or hydrocarbon feed introduced to the second dividing wall column. A fractionation column bottoms can be a fully purified product having up to about 90 mol %, about 95 mol %, about 97 mol %, about 98 mol %, about 99 mol %, or about 99.5 mol % or more of a single component of a first fractionation column bottoms, hydrocarbon fluid, and/or hydrocarbon feed introduced to the fractionation column. A first fractionation column bottoms can be a fully purified product having up to about 90 mol %, about 95 mol %, about 97 mol %, about 98 mol %, about 99 mol %, or about 99.5 mol % or more of a single component of a hydrocarbon fluid and/or hydrocarbon feed introduced to the first fractionation column.

At least a portion of the overhead, for example, the dividing wall column overhead, the first dividing wall column overhead, the second dividing wall column overhead, the fractionation column overhead, and/or the first fractionation column overhead, can be introduced to a heat exchange zone to provide a cooled and condensed overhead. Heat can be transferred within the heat exchange zone from the overhead to a heat transfer medium to provide a cooled overhead and a warmed heat transfer medium. Heat from the overhead can be indirectly transferred or directly transferred to the heat transfer medium. The heat transfer medium can be any suitable heat transfer medium. Illustrative heat transfer mediums can include, but are not limited to, air, water, liquid hydrocarbons, gaseous hydrocarbons, and/or boiling hydrocarbons.

At least a portion of the intermediate, for example, the dividing wall column intermediate, the first dividing wall column first intermediate, the first dividing wall column second intermediate, and/or the second dividing wall column intermediate, can be introduced to a heat exchange zone to provide a cooled intermediate. Heat can be transferred within the heat exchange zone from the intermediate to a heat transfer medium to provide a cooled intermediate and a warmed heat transfer medium. Heat from the intermediate can be indirectly transferred or directly transferred to the heat transfer medium. The heat transfer medium can be any suitable heat transfer medium. Illustrative heat transfer mediums can include, but are not limited to, air, water, liquid hydrocarbons, gaseous hydrocarbons, and/or boiling hydrocarbons.

For example, when the overhead and/or the intermediate includes methane, ethane, or a combination thereof, the heat transfer medium can include liquid hydrocarbons, gaseous hydrocarbons, and/or boiling hydrocarbons. Also for example, when the overhead and/or the intermediate includes propane, butane, pentane, or a combination thereof, the heat transfer medium can include air and/or water.

The heat exchange zone can include one or more systems, devices, or any combination of systems and/or devices suitable for exchanging heat between two or more fluids. The heat exchange zone can include one or more shell-and-tube exchangers, air cooled exchangers, plate-and-frame exchangers, U-tube exchangers, bent-tube exchangers, bayonet-tube exchangers, spiral wound exchangers, falling-film exchangers, or any combination thereof.

The heat exchange zone can be operated at a temperature ranging from a low of about −200° C., about −100° C., about −50° C., about 0° C., or about 50° C. to a high of about 100° C., or about 300° C. The heat exchange zone can be operated at a pressure ranging from a low of about 50 kPa, about 75 kPa, about 100 kPa, about 200 kPa, or about 300 kPa to a high of about 400 kPa, about 600 kPa, about 900 kPa, about 1,200 kPa, about 1,500 kPa, about 2,000 kPa, about 3,000 kPa, about 4,000 kPa, about 5,000 kPa, about 6,000 kPa, or about 7,000 kPa.

The overhead, cooled overhead, intermediate, and/or cooled intermediate can be recovered as a product for introducing to a process for producing a liquefied natural gas, for example, for use as a refrigerant in a natural gas liquefaction process and/or for use as a feedstock in a natural gas liquefaction process and/or for storage for future use. The overhead, cooled overhead, intermediate, and/or cooled intermediate can be introduced to a reflux drum, also referred to as an accumulator or a separator, where at least a portion of the overhead, cooled overhead, intermediate, and/or cooled intermediate can be recovered as a reflux drum bottoms. At least a portion of the reflux drum bottoms can be recovered as a product and/or for introducing to a process for producing a liquefied natural gas. At least a portion of the reflux drum bottoms can be recovered as a product for recycling or returning to the respective column as reflux. The overhead, cooled overhead, intermediate, and/or cooled intermediate can be introduced to a reflux drum where at least a portion of the overhead, cooled overhead, intermediate, and/or cooled intermediate can be recovered as a reflux drum overhead. At least a portion of the reflux drum overhead can be recovered as a gaseous product, e.g., for use as a fuel gas, and/or for introducing to a process for producing a liquefied natural gas. The overhead, cooled overhead, intermediate, and/or cooled intermediate can be introduced to a reflux drum where at least a portion of the overhead, cooled overhead, intermediate, and/or cooled intermediate can be recovered as a reflux drum overhead product for use as a fuel gas and/or for introducing to a process for producing a liquefied natural gas, at least a portion can be recovered as a reflux drum bottoms product for introducing to a process for producing a liquefied natural gas, and/or at least a portion can be recovered as a reflux drum bottoms product for recycling or returning to the respective column as reflux. The overhead, cooled overhead, intermediate, and/or cooled intermediate can be introduced to a reflux drum where at least a portion can be recovered as a reflux drum bottoms product for introducing to a process for producing a liquefied natural gas and/or at least a portion can be recovered as a reflux drum bottoms product for recycling or returning to the respective column as reflux. The overhead, cooled overhead, intermediate, and/or cooled intermediate can be introduced to a reflux drum where at least a portion can be recovered as a reflux drum bottoms for recycling or returning to the respective column as reflux.

For example, about 5% wt, about 10% wt, about 25% wt, about 50% wt, about 75% wt, about 90% wt, about 95% wt, about 99% wt, or more of the overhead, cooled overhead, intermediate, and/or cooled intermediate can be recycled as reflux to the respective column. The amount recycled as reflux to the respective column can remain constant or can vary.

At least a portion of the bottoms, for example, the dividing wall column bottoms, the first dividing wall column bottoms, the second dividing wall column bottoms, the fractionation column bottoms, and/or the first fractionation column bottoms, can be introduced to a reboiling zone where at least a portion of the bottoms can be recovered as a boiling fluid containing liquid and vapor, or vapor only, that can be recycled or returned to the respective column. For example, about 5% wt, about 10% wt, about 25% wt, about 50% wt, about 75% wt, about 90% wt, about 95% wt, about 99% wt, or more of the bottoms can be recycled or returned as a boiling fluid to the respective column. The amount recycled or returned as a boiling fluid to the respective column can remain constant or can vary.

The reboiling zone can include one or more systems, devices, or any combination of systems and/or devices suitable for exchanging heat between two or more fluids. The reboiling zone can include one or more shell-and-tube exchangers, plate-and-frame exchangers, U-tube exchangers, bent-tube exchangers, bayonet-tube exchangers, spiral wound exchangers, falling-film exchangers, or any combination thereof.

The reboiling zone can be operated at a temperature ranging from a low of about −50° C., about 0° C., or about 50° C. to a high of about 100° C., about 300° C., or about 500° C. The reboiling zone can be operated at a pressure ranging from a low of about 50 kPa, about 75 kPa, about 100 kPa, about 200 kPa, or about 300 kPa to a high of about 400 kPa, about 600 kPa, about 900 kPa, about 1,200 kPa, about 1,500 kPa, about 2,000 kPa, about 3,000 kPa, about 4,000 kPa, about 5,000 kPa, about 6,000 kPa, or about 7,000 kPa.

At least a portion of the overhead and/or reflux drum overhead, for example, from the dividing wall column, the first dividing wall column, the second dividing wall column, the fractionation column, and/or the first fractionation column, can be introduced as a product to a compressor to provide a compressed product. At least a portion of the product and/or compressed product can be passed as a gas product or compressed gas product to a pipeline. At least a portion of the overhead and/or reflux drum overhead can be condensed by heat exchange and/or compressed by a compressor. For example, the compressor can include two or more stages of compression with one or more interstage coolers disposed between the two or more compression stages.

The gas product and/or compressed gas product can be at a pressure ranging from a low of about 50 kPa, about 75 kPa, about 100 kPa, about 200 kPa, or about 300 kPa to a high of about 400 kPa, about 600 kPa, about 900 kPa, about 1,200 kPa, about 1,500 kPa, about 2,000 kPa, about 3,000 kPa, or about 3,500 kPa. About 5% wt, about 25% wt, about 50% wt, about 75% wt, about 90% wt, or about 95% wt or more of the overhead and/or reflux drum overhead, for example, from the dividing wall column, the first dividing wall column, the second dividing wall column, the fractionation column, and/or the first fractionation column, can be condensed by heat exchange and/or compressed within the compressor. For example, at least a portion of the overhead and/or reflux drum overhead can be condensed by heat exchange and at least a portion of the overhead and/or reflux drum overhead can be compressed within the compressor. The temperature of the overhead and/or reflux drum overhead can increase within the compressor. The temperature rise of the overhead and/or reflux drum overhead within the compressor can be about 5° C., about 10° C., about 25° C., about 50° C., about 100° C., about 150° C., or about 200° C. or more. The overhead and/or reflux drum overhead can be pre-heated in one or more optional heat exchange zones or "superheaters" prior to compressing and/or after compressing to provide the gas product and/or compressed gas product at a higher temperature than provided only by the one or more compressors.

The compressor can be driven using a mechanical driver such as a steam or gas turbine. The compressor can be driven using an electrical driver, e.g., an enclosed electric motor. The compressor can be driven with a combination of mechanical and/or electrical drivers, e.g., a steam turbine backed by a stand-by electric motor. The compressor can be driven using the energy recovered from an expander.

At least a portion of the overhead and/or reflux drum overhead, for example, from the dividing wall column, the first dividing wall column, the second dividing wall column, the fractionation column, and/or the first fractionation column, can be expanded by flowing through one or more expanders or expansion valves, e.g., to provide a two-phase cooled product. For example, about 5% wt, about 10% wt, about 25% wt, about 50% wt, about 75% wt, about 90% wt, about 95% wt, about 99% wt or more of the overhead and/or reflux drum overhead can be vaporized by flowing through one or more expansion valves.

At least a portion of the hydrocarbon feed and/or hydrocarbon fluid introduced to the one or more fractionation columns and/or one or more first fractionation columns can be expanded by flowing through one or more expanders or expansion valves, e.g., to provide a two-phase cooled product. For example, about 5% wt, about 10% wt, about 25% wt, about 50% wt, about 75% wt, about 90% wt, about 95% wt, about 99% wt or more of the hydrocarbon feed and/or hydrocarbon fluid introduced to the one or more fractionation columns and/or one or more first fractionation columns can be vaporized by flowing through one or more expansion valves.

The expander can have a work output. The work output provided by the expander can be used to generate electricity via one or more generators. The work output or energy recovered from the expander can be used to drive the compressor. The work output or energy provided by the expander can be used to help drive the compressor by direct mechanical connection. The one or more expansion valves can be replaced by one or more expanders having a work output. For example, the one or more expansion valves can be replaced by one or more fluid expanders having a work output.

FIG. 1 depicts an illustrative system 100 for separating hydrocarbons using one or more dividing wall columns for use in a process for producing a liquefied natural gas, according to one or more embodiments described. The system 100 can be used, e.g., in a C3MR process. The system 100 can include, but is not limited to, a fractionation column 104, one or more dividing wall columns 130, 172, and one or more reflux drums 116, 154, and 186. A hydrocarbon feed including methane can be introduced via line 102 to a fractionation column 104. A fractionation column overhead including methane can be recovered via line 106 and can be introduced to a first heat exchange zone 108 to provide for a cooled fractionation column overhead via line 110. A first heat exchange medium can be introduced to the first heat exchange zone 108 via line 112 to exchange heat with the fractionation column overhead. A heated first heat exchange medium can be recovered via line 114. The cooled fractionation column overhead via line 110 can be introduced to a first reflux drum 116 to provide for a first reflux drum overhead including methane via line 118. At least a portion of the first reflux drum overhead including methane via line 118 can be recovered as a product and/or can be passed to a process for producing a liquefied natural gas. A first reflux drum bottoms including methane can be recovered via line 120. At least a portion of the first reflux drum bottoms including methane can be recycled via line 122 to the fractionation column 104 as reflux. At least a portion of the first reflux drum bottoms including methane can be recovered via line 124 as a product and/or can be passed to a process for producing a liquefied natural gas. A fractionation column bottoms including a hydrocarbon fluid can be recovered from the fractionation column 104 via line 126. At least a portion of the fractionation column bottoms including the hydrocarbon fluid via line 126 can be introduced to a first dividing wall column 130.

At least a portion of the fractionation column bottoms including the hydrocarbon fluid via line 126 can be introduced to the first dividing wall column 130 at one or more locations along, above, and/or below a first fractionation zone 135 of the first dividing wall column 130. For example, at least a first portion of the fractionation column bottoms including the hydrocarbon fluid can be introduced to the first dividing wall column 130 via line 132 and at least a second portion of the fractionation column bottoms including the hydrocarbon fluid can be introduced to the first dividing wall column 130 via line 134. Also for example, introducing the first portion of the fractionation column bottoms including the hydrocarbon fluid via line 132 can be an option with at least a portion of the fractionation column bottoms including the hydrocarbon fluid via line 134 being introduced. The first dividing wall column 130 can include a first dividing wall 136, one or more sections of trays or packing 138 in the first fractionation zone 135 on one side of the dividing wall 136, and one or more sections of trays or packing 139 in a second fractionation zone 140 on the other side of the dividing wall 136. A first overhead including methane, ethane, or a combination thereof can be recovered via line 142. The first overhead including methane, ethane, or a combination thereof via line 142 can be recovered as a product and/or can be passed to a process for producing a liquefied natural gas. A first intermediate including ethane can be recovered via line 144 and can be introduced to a second heat exchange zone 146 to provide for a cooled first intermediate via line 148. A second heat exchange medium can be introduced to the second heat exchange zone 146 via line 150 to exchange heat with the first intermediate. A heated second heat exchange medium can be recovered via line 152. The cooled first intermediate via line 148 can be introduced to a second reflux drum 154. A second reflux drum bottoms including ethane can be recovered via line 156. At least a portion of the second reflux drum bottoms including ethane can be recycled via line 156 to the first dividing wall column 130 as reflux. A second intermediate including ethane can be recovered via line 158 from the first dividing wall column 130 at one or more locations along, above, and/or below the second fractionation zone 140 of the first dividing wall column 130. At least a portion of the second intermediate including ethane via line 158 can recovered as a product and/or can be passed to a process for producing a liquefied natural gas.

A first bottoms including one or more hydrocarbons having three or more carbon atoms per molecule can be recovered via line 164 from the first dividing wall column 130. At least a portion of the first bottoms including one or more hydrocarbons having three or more carbon atoms per molecule can be recovered via line 166 and can be introduced to a first reboiling zone 168 to provide for a heated first bottoms via line 170 that can be recycled to the first dividing wall column 130 as a first boiling fluid. At least a portion of the first bottoms including one or more hydrocarbons having three or more carbon atoms per molecule via line 164 can be introduced to a second dividing wall column 172 at one or more locations along, above, and/or below a first fractionation zone 175 of the second dividing wall column 172.

The second dividing wall column 172 can include a second dividing wall 174, one or more sections of trays or packing 176 in the first fractionation zone 175 on one side of the dividing wall 174, and one or more sections of trays or packing 178 in a second fractionation zone 179 on the other side of the dividing wall 174. A second overhead including propane can be recovered via line 180. The second overhead can be introduced via line 180 to a third heat exchange zone 181 to provide for a cooled second overhead via line 182. A third heat exchange medium can be passed to the third heat exchange zone 181 via line 183 to exchange heat with the second overhead. A heated third heat exchange medium can be recovered via line 184. The cooled second overhead via line 182 can be introduced to a third reflux drum 186. A third reflux drum bottoms including propane can be recovered via line 187. At least a portion of the third reflux drum bottoms including propane can be recycled via line 188 to the second dividing wall column 172 as reflux. At least a portion of the third reflux drum bottoms including propane via line 189 can be recovered as a product and/or can be passed to a process for producing a liquefied natural gas. A third intermediate including butane can be recovered via line 190 from the second dividing wall column 172 at one or more locations along, above, and/or below the second fractionation zone 179 of the second dividing wall column 172. At least a portion of the third intermediate including butane via line 190 can recovered as a product and/or can be passed to a process for producing a liquefied natural gas. A second bottoms including one or more hydrocarbons having five or more carbon atoms per molecule can be recovered via line 192 from the second dividing wall column 172. At least a portion of the second bottoms including one or more hydrocarbons having five or more carbon atoms per molecule via line 192 can be recovered as a product, e.g., as a condensate. At least a portion of the second bottoms including one or more hydrocarbons having five or more carbon atoms per molecule can be recovered via line 194 and can be introduced to a second reboiling zone 196 to provide for a heated second bottoms via line 198 that can be recycled to the second dividing wall column 172 as a second boiling fluid.

Figure 2:
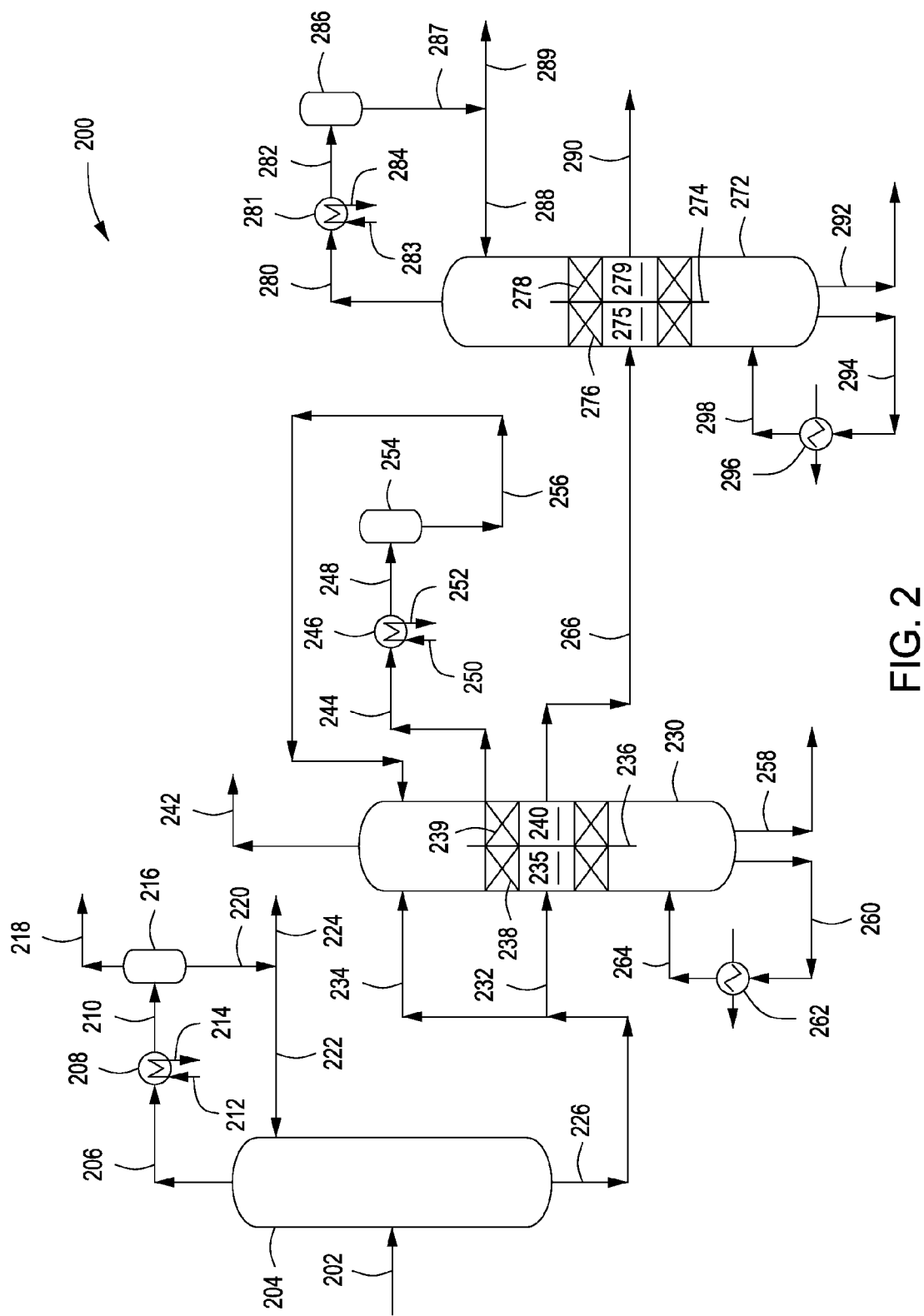
FIG. 2 depicts another illustrative system for separating hydrocarbons for use in a process for producing a liquefied natural gas using two dividing wall columns, according to one or more embodiments described.

FIG. 2 depicts an illustrative system 200 for separating hydrocarbons using one or more dividing wall columns for use in a process for producing a liquefied natural gas, according to one or more embodiments described. The system 200 can be used, e.g., in a C3MR process. The system 200 can include, but is not limited to, a fractionation column 204, one or more dividing wall columns 230, 272, and one or more reflux drums 216, 254, and 286. A hydrocarbon feed including methane can be introduced via line 202 to a fractionation column 204. A fractionation column overhead including methane can be recovered via line 206 and can be introduced to a first heat exchange zone 208 to provide for a cooled fractionation column overhead via line 210. A first heat exchange medium can be introduced to the first heat exchange zone 208 via line 212 to exchange heat with the fractionation column overhead. A heated first heat exchange medium can be recovered via line 214. The cooled fractionation column overhead via line 210 can be introduced to a first reflux drum 216 to provide for a first reflux drum overhead including methane via line 218. At least a portion of the first reflux drum overhead including methane via line 218 can be recovered as a product and/or can be passed to a process for producing a liquefied natural gas. A first reflux drum bottoms including methane can be recovered via line 220. At least a portion of the first reflux drum bottoms including methane can be recycled via line 222 to the fractionation column 204 as reflux. At least a portion of the first reflux drum bottoms including methane can be recovered via line 224 as a product and/or can be passed to a process for producing a liquefied natural gas. A fractionation column bottoms including a hydrocarbon fluid can be recovered from the fractionation column 204 via line 226. At least a portion of the fractionation column bottoms including the hydrocarbon fluid via line 226 can be introduced to a first dividing wall column 230.

At least a portion of the fractionation column bottoms including the hydrocarbon fluid via line 226 can be introduced to the first dividing wall column 230 at one or more locations along, above, and/or below a first fractionation zone 235 of the dividing wall column 230. For example, at least a first portion of the fractionation column bottoms including the hydrocarbon fluid can be introduced to the first dividing wall column 230 via line 232 and at least a second portion of the fractionation column bottoms including the hydrocarbon fluid can be introduced to the first dividing wall column 230 via line 234. Also for example, introducing the first portion of the fractionation column bottoms including the hydrocarbon fluid via line 232 can be an option with at least a portion of the fractionation column bottoms including the hydrocarbon fluid via line 234 being introduced. The first dividing wall column 230 can include a first dividing wall 236, one or more sections of trays or packing 238 in the first fractionation zone 235 on one side of the dividing wall 236, and one or more sections of trays or packing 239 in a second fractionation zone 240 on the other side of the dividing wall 236.

A first overhead including methane can be recovered via line 242. At least a portion of the first overhead including methane via line 242 can be recovered as a product and/or can be passed to a process for producing a liquefied natural gas. A first intermediate including one or more hydrocarbons having two to four carbon atoms per molecule can be recovered via line 244 and can be introduced to a second heat exchange zone 246 to provide for a cooled first intermediate via line 248. A second heat exchange medium can be introduced to the second heat exchange zone 246 via line 250 to exchange heat with the first intermediate. A heated second heat exchange medium can be recovered via line 252. The cooled first intermediate via line 248 can be introduced to a second reflux drum 254. A second reflux drum bottoms including one or more hydrocarbons having two to four carbon atoms per molecule can be recovered via line 256. At least a portion of the second reflux drum bottoms including one or more hydrocarbons having two to four carbon atoms per molecule can be recycled via line 256 to the first dividing wall column 230 as reflux. A first bottoms including one or more hydrocarbons having five or more carbon atoms per molecule can be recovered via line 258 from the first dividing wall column 230. At least a portion of the first bottoms including one or more hydrocarbons having five or more carbon atoms per molecule via line 258 can be recovered as a product, e.g., as a condensate. At least a portion of the first bottoms including one or more hydrocarbons having five or more carbon atoms per molecule can be recovered via line 260 and can be introduced to a first reboiling zone 262 to provide for a heated first bottoms via line 264 that can be recycled to the first dividing wall column 230 as a first boiling fluid.

A second intermediate including one or more hydrocarbons having two to four carbon atoms per molecule can be recovered via line 266 at one or more locations along, above, and/or below the second fractionation zone 240 of the dividing wall column 230. At least a portion of the second intermediate including one or more hydrocarbons having two to four carbon atoms per molecule can be introduced via line 266 to a second dividing wall column 272 at one or more locations along, above, and/or below a first fractionation zone 275 of the second dividing wall column 272. The second dividing wall column 272 can include a second dividing wall 274, one or more sections of trays or packing 276 in the first fractionation zone 275 on one side of the dividing wall 274, and one or more sections of trays or packing 278 in a second fractionation zone 279 on the other side of the dividing wall 274. A second overhead including ethane can be recovered via line 280. The second overhead including ethane can be introduced via line 280 to a third heat exchange zone 281 to provide for a cooled second overhead via line 282. A third heat exchange medium can be passed to the third heat exchange zone 281 via line 283 to exchange heat with the second overhead. A heated third heat exchange medium can be recovered via line 284. The cooled second overhead via line 282 can be introduced to a third reflux drum 286. A third reflux drum bottoms including ethane can be recovered via line 287. At least a portion of the third reflux drum bottoms including ethane can be recycled via line 288 to the second dividing wall column 272 as reflux. At least a portion of the third reflux drum bottoms including ethane via line 289 can be recovered as product and/or can be passed to a process for producing a liquefied natural gas. A third intermediate including propane can be recovered via line 290 from the second dividing wall column 272 at one or more locations along, above, and/or below the second fractionation zone 279 of the dividing wall column 272. At least a portion of the third intermediate including propane via line 290 can be recovered as a product and/or can be passed to a process for producing a liquefied natural gas. A second bottoms including butane can be recovered via line 292 from the second dividing wall column 272. At least a portion of the second bottoms including butane via line 292 can be recovered as a product and/or can be passed to a process for producing a liquefied natural gas. At least a portion of the second bottoms including butane can be recovered via line 294 and can be introduced to a second reboiling zone 296 to provide for a heated second bottoms via line 298 that can be recycled to the second dividing wall column 272 as a second boiling fluid.

Figure 3:
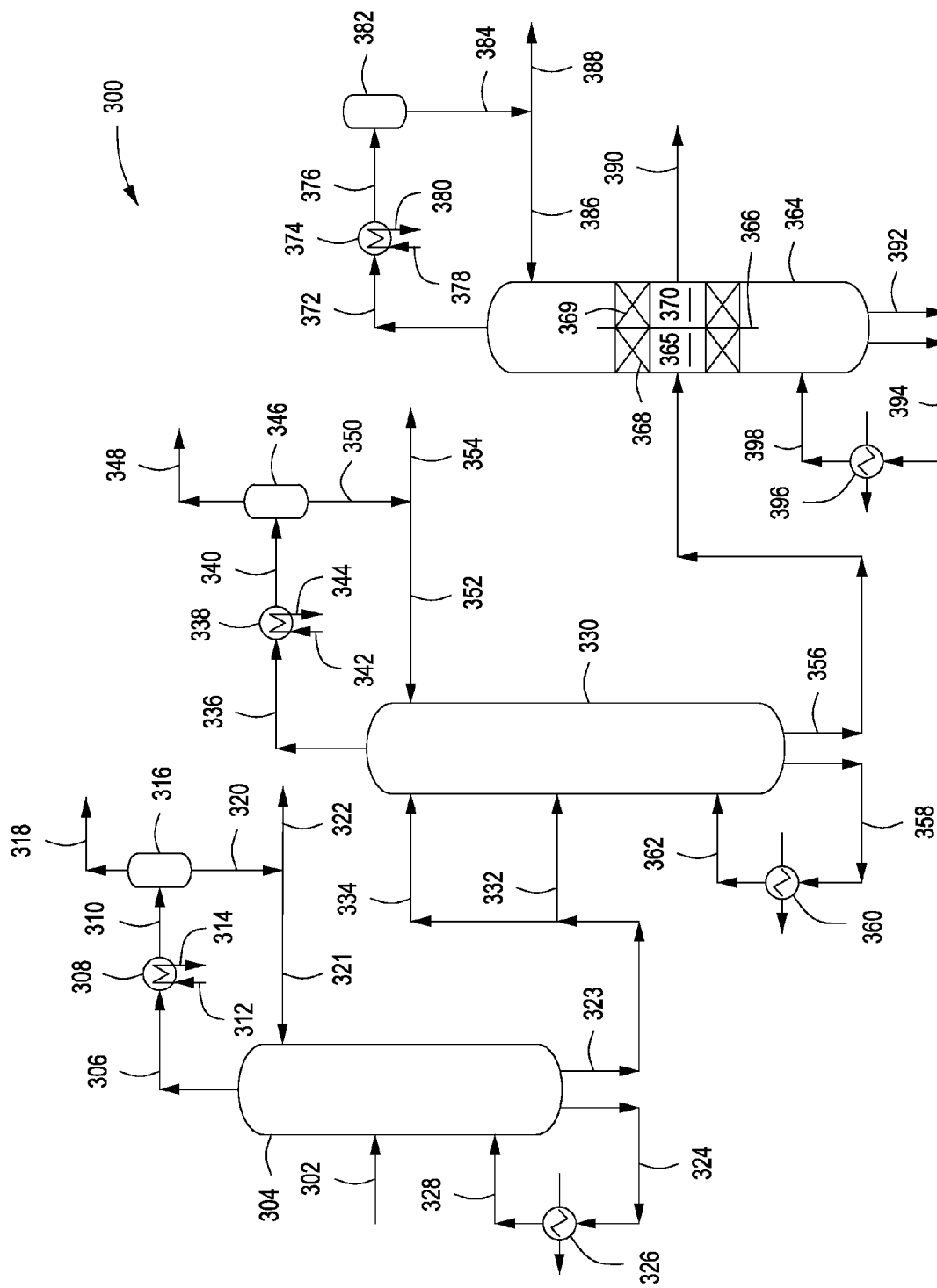
FIG. 3 depicts an illustrative system for separating hydrocarbons for use in a process for producing a liquefied natural gas using one dividing wall column, according to one or more embodiments described.

FIG. 3 depicts an illustrative system 300 for separating hydrocarbons using one dividing wall column for use in a process for producing a liquefied natural gas, according to one or more embodiments described. The system 300 can be used, e.g., in a C3MR process. The system 300 can include, but is not limited to, one or more fractionation columns 304, 330, a dividing wall column 364, and one or more reflux drums 316, 346, and 382. A hydrocarbon feed including methane can be introduced via line 302 to a first fractionation column 304. A first fractionation column overhead including methane can be recovered via line 306 and can be introduced to a first heat exchange zone 308 to provide for a cooled first fractionation column overhead via line 310. A first heat exchange medium can be introduced to the first heat exchange zone 308 via line 312 to exchange heat with the first fractionation column overhead. A heated first heat exchange medium can be recovered via line 314. The cooled first fractionation column overhead via line 310 can be introduced to a first reflux drum 316 to provide for a first reflux drum overhead including methane via line 318. At least a portion of the first reflux drum overhead including methane via line 318 can be recovered as a product and/or can be passed to a process for producing a liquefied natural gas. A first reflux drum bottoms including methane can be recovered via line 320. At least a portion of the first reflux drum bottoms including methane can be recycled via line 321 to the first fractionation column 304 as reflux. At least a portion of the first reflux drum bottoms including methane can be recovered via line 322 as a product and/or can be passed to a process for producing a liquefied natural gas. A first fractionation column bottoms including a hydrocarbon fluid (first hydrocarbon fluid) can be recovered from the first fractionation column 304 via line 323. At least a portion of the first fractionation column bottoms including the first hydrocarbon fluid can be recovered via line 324 and can be introduced to a first reboiling zone 326 to provide for a heated first hydrocarbon fluid via line 328 that can be recycled to the fractionation column 304 as a first boiling fluid. At least a portion of the first fractionation column bottoms including the first hydrocarbon fluid via line 323 can be introduced to a fractionation column 330.

At least a portion of the first fractionation column bottoms including the first hydrocarbon fluid via line 323 can be introduced to the fractionation column 330 at one or more locations along the fractionation column 330. For example, at least a first portion of the first fractionation column bottoms including the first hydrocarbon fluid can be introduced to the fractionation column 330 via line 332 and at least a second portion of the first fractionation column bottoms including the first hydrocarbon fluid can be introduced to the fractionation column 330 via line 334. Also for example, introducing the first portion of the first fractionation column bottoms including the first hydrocarbon fluid via line 332 can be an option with at least a portion of the first fractionation column bottoms including the first hydrocarbon fluid via line 334 being introduced. A fractionation column overhead including methane, ethane, or a combination thereof can be recovered via line 336 and can be introduced to a second heat exchange zone 338 to provide for a cooled fractionation column overhead via line 340. A second heat exchange medium can be passed to the second heat exchange zone 338 via line 342 to exchange heat with the fractionation column overhead. A heated second heat exchange medium can be recovered via line 344. The cooled fractionation column overhead via line 340 can be introduced to a second reflux drum 346 to provide for a second reflux drum overhead including methane, ethane, or a combination thereof via line 348. At least a portion of the second reflux drum overhead including methane, ethane, or a combination thereof via line 348 can be recovered as a product, e.g., for use as a fuel gas. A second reflux drum bottoms including ethane can be recovered via line 350. At least a portion of the second reflux drum bottoms including ethane can be recycled via line 352 to the fractionation column 330 as reflux. At least a portion of the second reflux drum bottoms including ethane via line 354 can be recovered as a product and/or can be passed to a process for producing a liquefied natural gas. A fractionation column bottoms including a hydrocarbon fluid including one or more hydrocarbons having three or more carbon atoms per molecule can be recovered via line 356 from the fractionation column 330. At least a portion of the fractionation column bottoms including the hydrocarbon fluid including one or more hydrocarbons having three or more carbon atoms per molecule can be recovered via line 358 and can be introduced to a second reboiling zone 360 to provide for a heated fractionation column bottoms via line 362 that can be recycled to the fractionation column 330 as a second boiling fluid. At least a portion of the fractionation column bottoms including the hydrocarbon fluid including one or more hydrocarbons having three or more carbon atoms per molecule via line 356 can be introduced to a dividing wall column 364 at one or more locations along, above, and/or below a first fractionation zone 365 of the dividing wall column 364.

The dividing wall column 364 can include a dividing wall 366, one or more sections of trays or packing 368 in the first fractionation zone 365 on one side of the dividing wall 366, and one or more sections of trays or packing 369 in a second fractionation zone 370 on the other side of the dividing wall 366. An overhead including propane can be recovered via line 372. The overhead including propane can be introduced via line 372 to a third heat exchange zone 374 to provide for a cooled overhead via line 376. A third heat exchange medium can be introduced to the third heat exchange zone 374 via line 378 to exchange heat with the overhead. A heated third heat exchange medium can be recovered via line 380. The cooled overhead via line 376 can be introduced to a third reflux drum 382. A third reflux drum bottoms including propane can be recovered via line 384. At least a portion of the third reflux drum bottoms including propane can be recycled via line 386 to the dividing wall column 364 as reflux. At least a portion of the third reflux drum bottoms including propane via line 388 can be recovered as a product and/or can be passed to a process for producing a liquefied natural gas. An intermediate including butane can be recovered via line 390 from the dividing wall column 364 at one or more locations along, above, and/or below the second fractionation zone 370 of the dividing wall column 364. At least a portion of the intermediate including butane via line 390 can recovered as a product and/or can be passed to a process for producing a liquefied natural gas. A dividing wall column bottoms including one or more hydrocarbons having five or more carbon atoms per molecule can be recovered via line 392 from the dividing wall column 364. At least a portion of the dividing wall column bottoms including one or more hydrocarbons having five or more carbon atoms per molecule via line 392 can be recovered as a product, e.g., as a condensate. At least a portion of the dividing wall column bottoms including one or more hydrocarbons having five or more carbon atoms per molecule can be recovered via line 394 and can be introduced to a third reboiling zone 396 to provide for a heated bottoms via line 398 that can be recycled to the dividing wall column 364 as a third boiling fluid.

Figure 4:
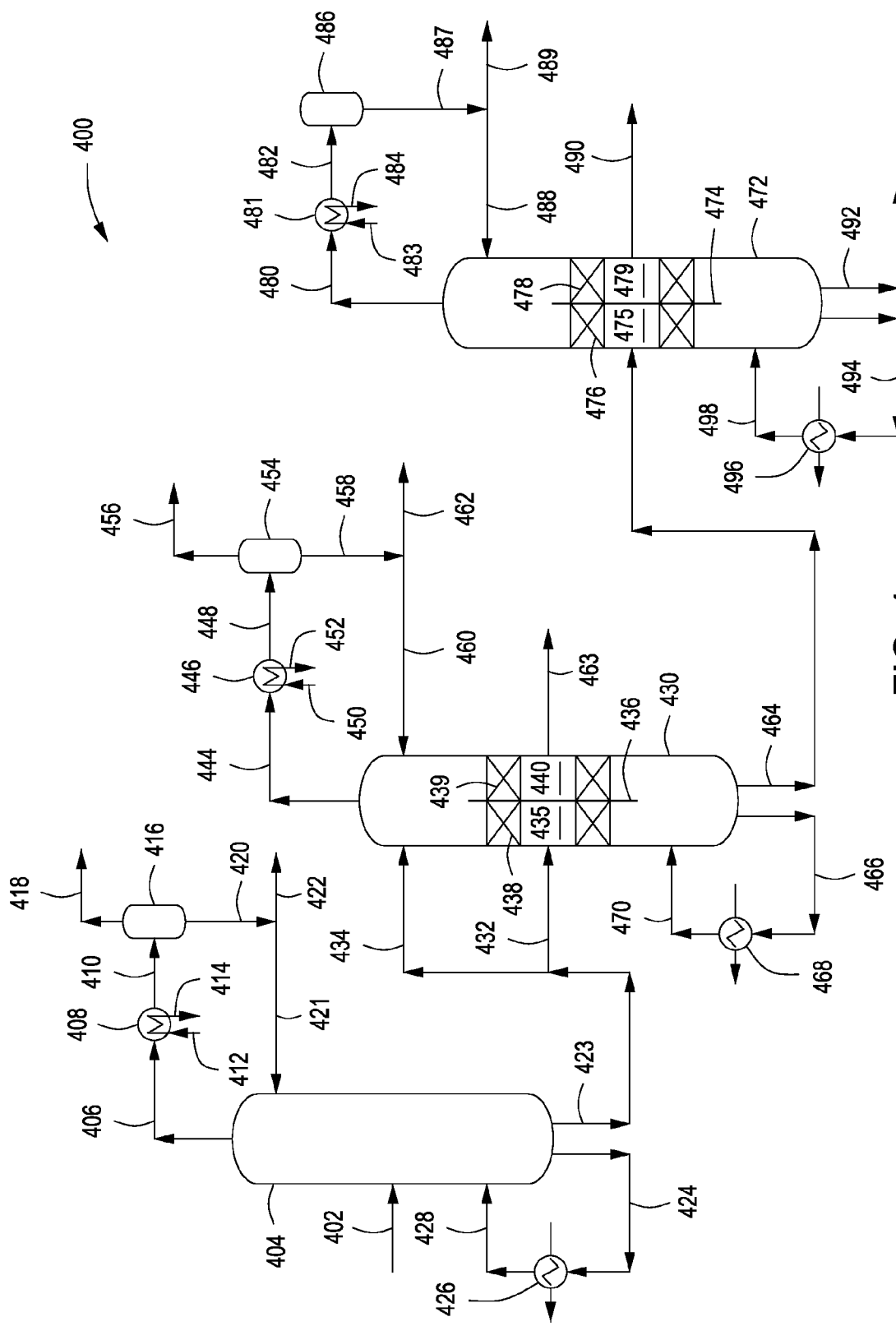
FIG. 4 depicts another illustrative system for separating hydrocarbons for use in a process for producing a liquefied natural gas using two dividing wall columns, according to one or more embodiments described.

FIG. 4 depicts an illustrative system 400 for separating hydrocarbons using one or more dividing wall columns for use in a process for producing a liquefied natural gas, according to one or more embodiments described. The system 400 can be used, e.g., in a DMR process. The system 400 can include, but is not limited to, a fractionation column 404, one or more dividing wall columns 430, 472, and one or more reflux drums 416, 454, and 486. A hydrocarbon feed including methane can be introduced via line 402 to a fractionation column 404. A fractionation column overhead including methane can be recovered via line 406 and can be introduced to a first heat exchange zone 408 to provide for a cooled fractionation column overhead via line 410. A first heat exchange medium can be introduced to the first heat exchange zone 408 via line 412 to exchange heat with the fractionation column overhead. A heated first heat exchange medium can be recovered via line 414. The cooled fractionation column overhead via line 410 can be introduced to a first reflux drum 416 to provide for a first reflux drum overhead including methane via line 418. At least a portion of the first reflux drum overhead including methane via line 418 can be recovered as a product and/or can be passed to a process for producing a liquefied natural gas. A first reflux drum bottoms including methane can be recovered via line 420. At least a portion of the first reflux drum bottoms including methane can be recycled via line 421 to the fractionation column 404 as reflux. At least a portion of the first reflux drum bottoms including methane can be recovered via line 422 as a product and/or can be passed to a process for producing a liquefied natural gas. A fractionation column bottoms including a hydrocarbon fluid can be recovered via line 423 from the fractionation column 404. At least a portion of the fractionation column bottoms including the hydrocarbon fluid can be recovered via line 424 and can be introduced to a first reboiling zone 426 to provide for a heated hydrocarbon fluid via line 428 that can be recycled to the fractionation column 404 as a first boiling fluid. At least a portion of the fractionation column bottoms including the hydrocarbon fluid via line 423 can be introduced to a first dividing wall column 430.

At least a portion of the fractionation column bottoms including the hydrocarbon fluid via line 423 can be introduced to the first dividing wall column 430 at one or more locations along, above, and/or below a first fractionation zone 435 of the first dividing wall column 430. For example, at least a first portion of the fractionation column bottoms including the hydrocarbon fluid can be introduced to the first dividing wall column 430 via line 432 and at least a second portion of the fractionation column bottoms including the hydrocarbon fluid can be introduced to the first dividing wall column 430 via line 434. Also for example, introducing the first portion of the fractionation column bottoms including the hydrocarbon fluid via line 432 can be an option with at least a portion of the fractionation column bottoms including the hydrocarbon fluid via line 434 being introduced. The first dividing wall column 430 can include a first dividing wall 436, one or more sections of trays or packing 438 in the first fractionation zone 435 on one side of the dividing wall 436, and one or more sections of trays or packing 439 in a second fractionation zone 440 on the other side of the dividing wall 436. A first overhead including methane, ethane, or a combination thereof can be recovered via line 444 and can be introduced to a second heat exchange zone 446 to provide for a cooled first intermediate via line 448. A second heat exchange medium can be introduced to the second heat exchange zone 446 via line 450 to exchange heat with the first intermediate. A heated second heat exchange medium can be recovered via line 452. The cooled first intermediate via line 448 can be introduced to a second reflux drum 454 to provide for a second reflux drum overhead including methane, ethane, or a combination thereof via line 456. At least a portion of the second reflux drum overhead including methane, ethane, or a combination thereof via line 456 can be recovered as a product, e.g., for use as a fuel gas. A second reflux drum bottoms including ethane can be recovered via line 458. At least a portion of the second reflux drum bottoms including ethane can be recycled via line 460 to the first dividing wall column 430 as reflux. At least a portion of the second reflux drum bottoms including ethane via line 462 can be recovered as a product and/or can be passed to a process for producing a liquefied natural gas. A first intermediate including propane can be recovered via line 463 from the first dividing wall column 430 at one or more locations along, above, and/or below the second fractionation zone 440 of the first dividing wall column 430. At least a portion of the first intermediate including propane via line 463 can recovered as a product and/or can be passed to a process for producing a liquefied natural gas.

A first bottoms including one or more hydrocarbons having four or more carbon atoms per molecule can be recovered via line 464 from the first dividing wall column 430. At least a portion of the first bottoms including one or more hydrocarbons having four or more carbon atoms per molecule can be recovered via line 466 and can be introduced to a second reboiling zone 468 to provide for a heated first bottoms via line 470 that can be recycled to the first dividing wall column 430 as a second boiling fluid. At least a portion of the first bottoms including one or more hydrocarbons having four or more carbon atoms per molecule via line 464 can be introduced to a second dividing wall column 472 at one or more locations along, above, and/or below a first fractionation zone 475 of the second dividing wall column 472.

The second dividing wall column 472 can include a second dividing wall 474, one or more sections of trays or packing 476 in the first fractionation zone 475 on one side of the dividing wall 474, and one or more sections of trays or packing 478 in a second fractionation zone 479 on the other side of the dividing wall 474. A second overhead including butane can be recovered via line 480. The second overhead can be introduced via line 480 to a third heat exchange zone 481 to provide for a cooled second overhead via line 482. A third heat exchange medium can be passed to the third heat exchange zone 481 via line 483 to exchange heat with the second overhead. A heated third heat exchange medium can be recovered via line 484. The cooled second overhead via line 482 can be introduced to a third reflux drum 486. A third reflux drum bottoms including butane can be recovered via line 487. At least a portion of the third reflux drum bottoms including butane can be recycled via line 488 to the second dividing wall column 472 as reflux. At least a portion of the third reflux drum bottoms including butane via line 489 can be recovered as a product and/or can be passed to a process for producing a liquefied natural gas. A second intermediate including pentane can be recovered via line 490 from the second dividing wall column 472 at one or more locations along, above, and/or below the second fractionation zone 479 of the second dividing wall column 472. At least a portion of the second intermediate including pentane via line 490 can recovered as a product and/or can be passed to a process for producing a liquefied natural gas. A second bottoms including one or more hydrocarbons having six or more carbon atoms per molecule can be recovered via line 492 from the second dividing wall column 472. At least a portion of the second bottoms including one or more hydrocarbons having six or more carbon atoms per molecule via line 492 can be recovered as a product, e.g., as a condensate. At least a portion of the second bottoms including one or more hydrocarbons having six or more carbon atoms per molecule can be recovered via line 494 and can be introduced to a third reboiling zone 496 to provide for a heated second bottoms via line 498 that can be recycled to the second dividing wall column 472 as a third boiling fluid.

Figure 5:
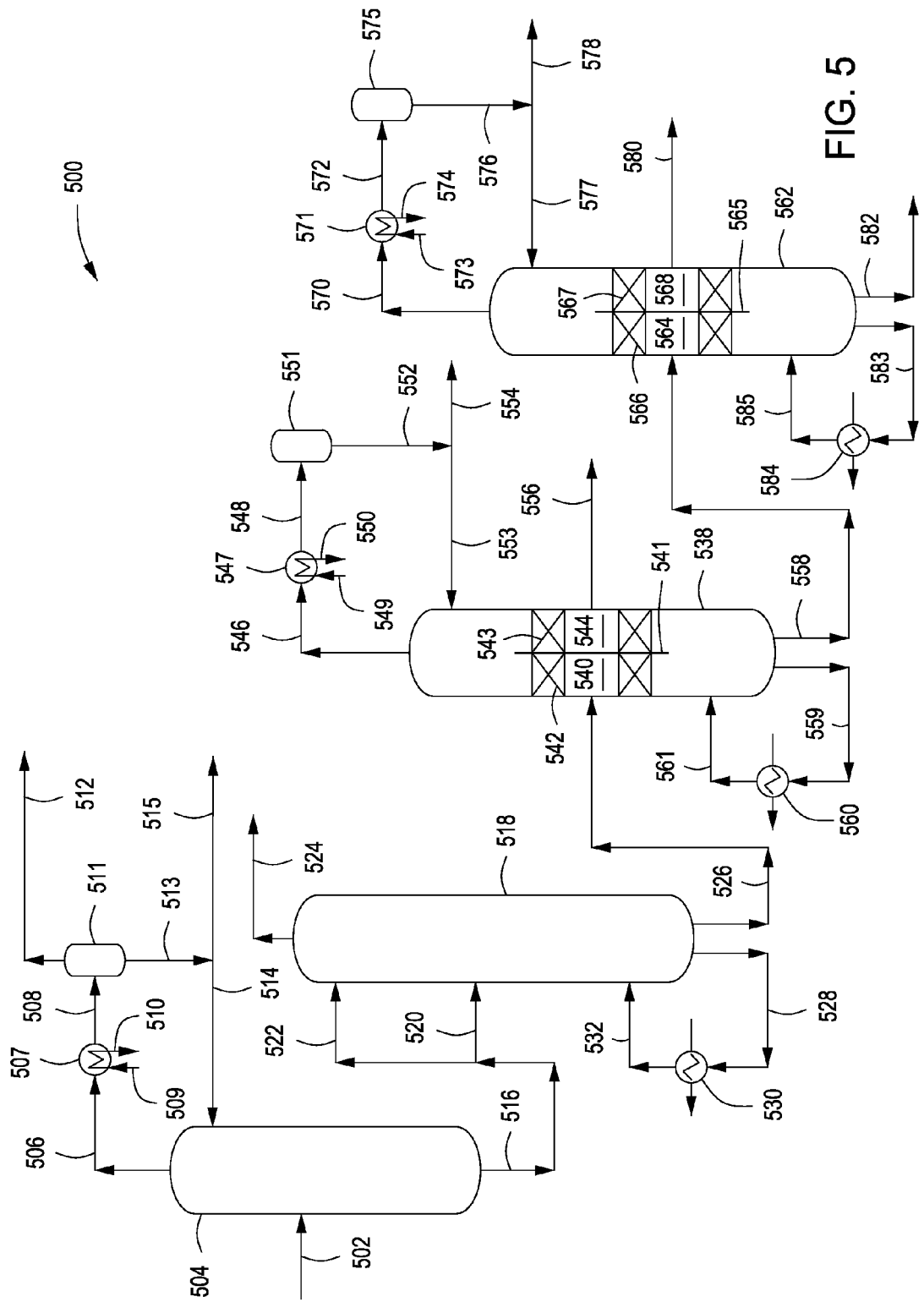
FIG. 5 depicts yet another illustrative system for separating hydrocarbons for use in a process for producing a liquefied natural gas using two dividing wall columns, according to one or more embodiments described.

FIG. 5 depicts an illustrative system 500 for separating hydrocarbons using one or more dividing wall columns for use in a process for producing a liquefied natural gas, according to one or more embodiments described. The system 500 can be used, e.g., in a DMR process. The system 500 can include, but is not limited to, one or more fractionation columns 504, 518, one or more dividing wall columns 538, 562 and one or more reflux drums 511, 551, and 575. A hydrocarbon feed including methane can be introduced via line 502 to a first fractionation column 504. A first fractionation column overhead including methane can be recovered via line 506 and can be introduced to a first heat exchange zone 507 to provide for a cooled first fractionation column overhead via line 508. A first heat exchange medium can be introduced to the first heat exchange zone 507 via line 509 to exchange heat with the first fractionation column overhead. A heated first heat exchange medium can be recovered via line 510. The cooled first fractionation column overhead via line 508 can be introduced to a first reflux drum 511 to provide for a first reflux drum overhead including methane via line 512. At least a portion of the first reflux drum overhead including methane via line 512 can be recovered as a product and/or can be passed to a process for producing a liquefied natural gas. A first reflux drum bottoms including methane can be recovered via line 513. At least a portion of the first reflux drum bottoms including methane can be recycled via line 514 to the first fractionation column 504 as reflux. At least a portion of the first reflux drum bottoms including methane can be recovered via line 515 as a product and/or can be passed to a process for producing a liquefied natural gas. A first fractionation column bottoms including a hydrocarbon fluid (first hydrocarbon fluid) can be recovered from the first fractionation column 504 via line 516. At least a portion of the first fractionation column bottoms including the first hydrocarbon fluid via line 516 can be introduced to a fractionation column 518.

At least a portion of the first fractionation column bottoms including the first hydrocarbon fluid via line 516 can be introduced to the fractionation column 518 at one or more locations along the fractionation column 518. For example, at least a first portion of the first fractionation column bottoms including the first hydrocarbon fluid can be introduced to the fractionation column 518 via line 520 and at least a second portion of the first fractionation column bottoms including the first hydrocarbon fluid can be introduced to the fractionation column 518 via line 522. Also for example, introducing the first portion of the first fractionation column bottoms including the first hydrocarbon fluid via line 520 can be an option with at least a portion of the first fractionation column bottoms including the first hydrocarbon fluid via line 522 being introduced. A fractionation column overhead including methane, ethane, or a combination thereof can be recovered via line 524. At least a portion of the fractionation column overhead including methane, ethane, or a combination thereof via line 524 can be recovered as a product and/or can be passed to a process for producing a liquefied natural gas. A fractionation column bottoms including a hydrocarbon fluid including one or more hydrocarbons having two or more carbon atoms per molecule can be recovered via line 526 from the fractionation column 518. At least a portion of the fractionation column bottoms including the hydrocarbon fluid including one or more hydrocarbons having two or more carbon atoms per molecule can be recovered via line 528 and can be introduced to a first reboiling zone 530 to provide for a heated fractionation column bottoms via line 532 that can be recycled to the fractionation column 518 as a first boiling fluid.

At least a portion of the fractionation column bottoms including the hydrocarbon fluid including one or more hydrocarbons having two or more carbon atoms per molecule via line 526 can be introduced to a first dividing wall column 538 at one or more locations along, above, and/or below a first fractionation zone 540 of the first dividing wall column 538. The first dividing wall column 538 can include a dividing wall 541, one or more sections of trays or packing 542 in the first fractionation zone 540 on one side of the dividing wall 541, and one or more sections of trays or packing 543 in a second fractionation zone 544 on the other side of the dividing wall 541. A first overhead including ethane can be recovered via line 546. The first overhead including ethane can be introduced via line 546 to a second heat exchange zone 547 to provide for a cooled overhead via line 548. A second heat exchange medium can be introduced to the second heat exchange zone 547 via line 549 to exchange heat with the overhead. A heated second heat exchange medium can be recovered via line 550. The cooled overhead via line 548 can be introduced to a second reflux drum 551. A second reflux drum bottoms including ethane can be recovered via line 552. At least a portion of the second reflux drum bottoms including ethane can be recycled via line 553 to the first dividing wall column 538 as reflux. At least a portion of the second reflux drum bottoms including ethane via line 554 can be recovered as a product and/or can be passed to a process for producing a liquefied natural gas. A first intermediate including propane can be recovered via line 556 from the first dividing wall column 538 at one or more locations along, above, and/or below the second fractionation zone 544 of the first dividing wall column 538. At least a portion of the first intermediate including propane via line 556 can recovered as a product and/or can be passed to a process for producing a liquefied natural gas. A first dividing wall column bottoms including one or more hydrocarbons having four or more carbon atoms per molecule can be recovered via line 558 from the first dividing wall column 538. At least a portion of the first dividing wall column bottoms including one or more hydrocarbons having four or more carbon atoms per molecule can be recovered via line 559 and can be introduced to a second reboiling zone 560 to provide for a heated first dividing wall column bottoms via line 561 that can be recycled to the first dividing wall column 538 as a second boiling fluid. At least a portion of the first dividing wall column bottoms including one or more hydrocarbons having four or more carbon atoms per molecule via line 558 can be introduced to a second dividing wall column 562 at one or more locations along, above, and/or below a first fractionation zone 564 of the second dividing wall column 562.

The second dividing wall column 562 can include a dividing wall 565, one or more sections of trays or packing 566 in the first fractionation zone 564 on one side of the dividing wall 565, and one or more sections of trays or packing 567 in a second fractionation zone 568 on the other side of the dividing wall 565. A second overhead including butane can be recovered via line 570. The second overhead including butane can be introduced via line 570 to a third heat exchange zone 571 to provide for a cooled overhead via line 572. A third heat exchange medium can be introduced to the third heat exchange zone 571 via line 573 to exchange heat with the overhead. A heated third heat exchange medium can be recovered via line 574. The cooled overhead via line 572 can be introduced to a third reflux drum 575. A third reflux drum bottoms including butane can be recovered via line 576. At least a portion of the third reflux drum bottoms including butane can be recycled via line 577 to the second dividing wall column 562 as reflux. At least a portion of the third reflux drum bottoms including butane via line 578 can be recovered as a product and/or can be passed to a process for producing a liquefied natural gas. A second intermediate including pentane can be recovered via line 580 from the second dividing wall column 562 at one or more locations along, above, and/or below the second fractionation zone 568 of the second dividing wall column 562. At least a portion of the second intermediate including pentane via line 580 can recovered as a product and/or can be passed to a process for producing a liquefied natural gas. A second dividing wall column bottoms including one or more hydrocarbons having six or more carbon atoms per molecule can be recovered via line 582 from the second dividing wall column 562. At least a portion of the second dividing wall column bottoms including one or more hydrocarbons having six or more carbon atoms per molecule via line 582 can be recovered as a product, e.g., as a condensate. At least a portion of the second dividing wall column bottoms including one or more hydrocarbons having six or more carbon atoms per molecule can be recovered via line 583 and can be introduced to a third reboiling zone 584 to provide for a heated second dividing wall column bottoms via line 585 that can be recycled to the second dividing wall column 562 as a third boiling fluid.

Prophetic Examples

Embodiments of the present invention can be further described with the following prophetic examples. Two simulated examples are provided. Example 1 is directed to a conventional method of separating hydrocarbons using four fractionation columns. The arrangement of Example 1 includes a fractionation column (scrub column) followed in order by a deethanizer, a depropanizer, and a debutanizer. Example 2 is directed to a system and method of separating hydrocarbons described above with regard to FIG. 1. Table 1 summarizes the simulated results for Example 1. Table 2 summarizes the simulated results for Example 2.

In Example 1, a hydrocarbon feed including methane is introduced to the fractionation column that includes an overhead heat exchange zone, a reflux drum, a recycle/reflux to the fractionation column, and a reboiler. A fractionation column overhead including methane is introduced to the overhead heat exchange zone to provide for a cooled fractionation column overhead including methane that is introduced to a fractionation column reflux drum. At least a portion of the fractionation column reflux drum overhead including methane is introduced to a stream combining the deethanizer reflux drum bottoms including ethane, the depropanizer reflux drum bottoms including propane, and the debutanizer reflux drum bottoms including butane and is introduced to a process for producing a liquefied natural gas. At least a portion of the fractionation column reflux drum bottoms is recycled to the fractionation column as reflux. At least a portion of the fractionation column bottoms including methane is introduced to the fractionation column reboiler and recycled to the fractionation column. A fractionation column bottoms including methane is recovered and at least a portion is introduced to a deethanizer that includes an overhead heat exchange zone, a reflux drum, a recycle/reflux to the deethanizer, and a reboiler. A deethanizer overhead including methane and ethane is introduced to the deethanizer overhead heat exchange zone to provide for a cooled deethanizer overhead. The cooled deethanizer overhead including methane and ethane is introduced to the deethanizer reflux drum to recover a deethanizer reflux drum overhead including methane and ethane and a deethanizer reflux drum bottoms including ethane. At least portion of the deethanizer reflux drum overhead including methane and ethane is recovered as product and/or is passed to a process for producing a liquefied natural gas. At least a portion of the deethanizer reflux drum bottoms including ethane is recycled or refluxed to the deethanizer. At least a portion of the deethanizer reflux drum bottoms including ethane is recovered as a product and/or is passed to a process for producing a liquefied natural gas and at least a portion of the deethanizer reflux drum bottoms including ethane is introduced to a stream combining the fractionation column reflux drum overhead including methane, the depropanizer reflux drum bottoms including propane, and the debutanizer reflux drum bottoms including butane and is introduced to a process for producing a liquefied natural gas. At least a portion of the deethanizer bottoms including one or more hydrocarbons having three or more carbon atoms per molecule is introduced to the deethanizer reboiler and recycled to the deethanizer. A deethanizer bottoms including one or more hydrocarbons having three or more carbon atoms per molecule is recovered and at least a portion is introduced to the depropanizer.

The depropanizer includes an overhead heat exchange zone, a reflux drum, a recycle/reflux to the depropanizer, and a reboiler. A depropanizer overhead including propane is introduced to the depropanizer overhead heat exchange zone to provide a cooled depropanizer overhead that is introduced to the depropanizer reflux drum to recover a depropanizer reflux drum bottoms including propane. At least a portion of the depropanizer reflux drum bottoms including propane is recycled or refluxed to the depropanizer. At least a portion of the depropanizer reflux drum bottoms including propane is recovered as product and/or is passed to a process for producing a liquefied natural gas and at least a portion of the depropanizer reflux drum bottoms including propane is introduced to a stream combining the fractionation column reflux drum overhead including methane, the deethanizer reflux drum bottoms including ethane, and the debutanizer reflux drum bottoms including butane and is introduced to a process for producing a liquefied natural gas. At least a portion of the depropanizer bottoms including one or more hydrocarbons having four or more carbon atoms per molecule is introduced to the depropanizer reboiler and recycled to the depropanizer. A depropanizer bottoms including one or more hydrocarbons having four or more carbon atoms per molecule is recovered and at least a portion is introduced to the debutanizer.

The debutanizer includes an overhead heat exchange zone, a reflux drum, a recycle/reflux to the debutanizer, and a reboiler. A debutanizer overhead including butane is introduced to the overhead heat exchange zone to provide a cooled debutanizer overhead that is introduced to the debutanizer reflux drum to recover a debutanizer reflux drum bottoms including butane. At least a portion of the debutanizer reflux drum bottoms including butane is recycled or refluxed to the debutanizer. At least a portion of the debutanizer reflux drum bottoms including butane is recovered as product and/or is passed to a process for producing a liquefied natural gas and at least a portion of the debutanizer reflux drum bottoms including butane is introduced to a stream combining the fractionation column reflux drum overhead including methane, the deethanizer reflux drum bottoms including ethane, and the depropanizer reflux drum bottoms including propane and is introduced to a process for producing a liquefied natural gas. At least a portion of the debutanizer bottoms including one or more hydrocarbons having five or more carbon atoms per molecule is introduced to the debutanizer reboiler and recycled to the debutanizer. A debutanizer bottoms including one or more hydrocarbons having five or more carbon atoms per molecule is recovered as product (condensate).

Example 2 is directed to a method of separating hydrocarbons described above with regard to FIG. 1. The composition of the hydrocarbon feed to the fractionation column used in Example 2 is the same composition as the hydrocarbon feed to the fractionation column used in Example 1, Table 2 discloses various Example 2 properties and compositions of various fluids including the hydrocarbon feed to the fractionation column (scrub column) (FIG. 1, 102), the fractionation column reflux drum bottoms reflux to the fractionation column (FIG. 1, 122), the fractionation column reflux drum overhead including methane introduced to the process for producing liquefied natural gas ("to cryogenic heat exchanger") (FIG. 1, 118), the methane product in the first overhead (FIG. 1, 142), the ethane product recovered from the first dividing wall column first reflux drum bottoms (FIG. 1, 156), the propane product recovered from the second dividing wall column second reflux drum bottoms (FIG. 1, 189), the butane product recovered as the third intermediate from the second dividing wall column (FIG. 1, 190), and the product recovered as the second bottoms from the second dividing wall column including one or more hydrocarbons having five or more carbon atoms per molecule (FIG. 1, 192).

Table 1 summarizes the simulated results for Example 1.

TABLE 1

| Property | Feed to Scrub Column | Reflux to Scrub Column | to Cryogenic Heat Exchanger | Ethane | Propane | Butanes | Condensates (C5+) |
|---|---|---|---|---|---|---|---|
| Temperature, °C. | −17 | −34 | −34 | −28 | 51 | 48 | 112 |
| Pressure, bar | 55 | 55 | 55 | 26 | 26 | 6 | 6 |
| Mass Flow, kg/h | 563,276 | 35,399 | 540,966 | 530 | 3,743 | 5,566 | 9,934 |
| Compositions (mol %) | | | | | | | |
| Nitrogen | 0.84% | 0.15% | 0.83% | 0.00% | 0.00% | 0.00% | 0.00% |
| CO2 | 0.00% | 0.01% | 0.00% | 0.01% | 0.00% | 0.00% | 0.00% |
| Methane | 88.66% | 46.32% | 88.20% | 15.72% | 0.00% | 0.00% | 0.00% |
| Ethane | 6.76% | 17.24% | 7.01% | 83.64% | 0.15% | 0.00% | 0.00% |
| Propane | 2.33% | 17.47% | 2.63% | 0.63% | 99.75% | 1.17% | 0.00% |
| i-Butane | 0.44% | 6.16% | 0.53% | 0.00% | 0.10% | 38.24% | 0.01% |
| n-Butane | 0.50% | 8.37% | 0.60% | 0.00% | 0.00% | 60.56% | 0.29% |
| i-Pentane | 0.19% | 2.91% | 0.14% | 0.00% | 0.00% | 0.04% | 36.08% |
| n-Pentane | 0.12% | 1.34% | 0.05% | 0.00% | 0.00% | 0.00% | 27.09% |
| Methylcyclopentane | 0.01% | 0.00% | 0.00% | 0.00% | 0.00% | 0.00% | 3.53% |
| Benzene | 0.02% | 0.00% | 0.00% | 0.00% | 0.00% | 0.00% | 3.85% |
| Cyclohexane | 0.02% | 0.00% | 0.00% | 0.00% | 0.00% | 0.00% | 4.24% |
| Methylcyclohexane | 0.01% | 0.00% | 0.00% | 0.00% | 0.00% | 0.00% | 2.23% |
| Toluene | 0.01% | 0.00% | 0.00% | 0.00% | 0.00% | 0.00% | 1.21% |
| Ethylbenzene | 0.00% | 0.00% | 0.00% | 0.00% | 0.00% | 0.00% | 0.03% |
| para-Xylene | 0.00% | 0.00% | 0.00% | 0.00% | 0.00% | 0.00% | 0.13% |
| 124-Methylbenzene | 0.00% | 0.00% | 0.00% | 0.00% | 0.00% | 0.00% | 0.00% |
| Hexane | 0.08% | 0.02% | 0.00% | 0.00% | 0.00% | 0.00% | 19.01% |
| Heptane | 0.01% | 0.00% | 0.00% | 0.00% | 0.00% | 0.00% | 1.84% |

Table 2 summarizes the simulated results for Example 2.

TABLE 2

| Property | Feed to Scrub Column | Reflux to Scrub Column | to Cryogenic Heat Exchanger | Methane | Ethane | Propane | Butanes | Condensates (C5+) |
|---|---|---|---|---|---|---|---|---|
| Temperature, °C. | −17 | −34 | −34 | −17 | 14 | 19 | 65 | 125 |
| Pressure, bar | 55 | 55 | 55 | 30 | 30 | 8 | 8 | 9 |
| Mass Flow, kg/h | 563,276 | 34,000 | 538,659 | 4,852 | 1,650 | 3,250 | 5,550 | 8,962 |
| Compositions (mol %) | | | | | | | | |
| Nitrogen | 0.84% | 0.16% | 0.83% | 0.27% | 0.00% | 0.00% | 0.00% | 0.00% |
| CO2 | 0.00% | 0.01% | 0.00% | 0.01% | 0.00% | 0.00% | 0.00% | 0.00% |
| Methane | 88.66% | 46.43% | 88.20% | 83.13% | 0.14% | 0.00% | 0.00% | 0.00% |
| Ethane | 6.76% | 17.24% | 7.01% | 12.57% | 90.36% | 0.01% | 0.00% | 0.00% |
| Propane | 2.33% | 17.58% | 2.63% | 2.87% | 7.57% | 99.97% | 0.43% | 0.00% |
| i-Butane | 0.44% | 6.24% | 0.53% | 0.44% | 0.92% | 0.03% | 41.03% | 0.68% |
| n-Butane | 0.50% | 8.52% | 0.60% | 0.46% | 1.04% | 0.00% | 58.01% | 0.84% |
| i-Pentane | 0.19% | 2.75% | 0.14% | 0.14% | 0.04% | 0.00% | 0.41% | 36.98% |
| n-Pentane | 0.12% | 1.06% | 0.05% | 0.08% | 0.02% | 0.00% | 0.12% | 25.60% |
| Methylcyclopentane | 0.01% | 0.00% | 0.00% | 0.00% | 0.00% | 0.00% | 0.00% | 3.53% |
| Benzene | 0.02% | 0.00% | 0.00% | 0.00% | 0.00% | 0.00% | 0.00% | 3.85% |
| Cyclohexane | 0.02% | 0.00% | 0.00% | 0.00% | 0.00% | 0.00% | 0.00% | 4.24% |
| Methylcyclohexane | 0.01% | 0.00% | 0.00% | 0.00% | 0.00% | 0.00% | 0.00% | 2.23% |
| Toluene | 0.01% | 0.00% | 0.00% | 0.00% | 0.00% | 0.00% | 0.00% | 1.21% |
| Ethylbenzene | 0.00% | 0.00% | 0.00% | 0.00% | 0.00% | 0.00% | 0.00% | 0.03% |
| para-Xylene | 0.00% | 0.00% | 0.00% | 0.00% | 0.00% | 0.00% | 0.00% | 0.13% |
| 124-Methylbenzene | 0.00% | 0.00% | 0.00% | 0.00% | 0.00% | 0.00% | 0.00% | 0.00% |
| Hexane | 0.08% | 0.02% | 0.00% | 0.00% | 0.00% | 0.00% | 0.00% | 19.01% |
| Heptane | 0.01% | 0.00% | 0.00% | 0.00% | 0.00% | 0.00% | 0.00% | 1.84% |

The total duty for Example 1 is 8,017 kilowatts that is significantly higher than the total duty for Example 2 that is 6,575 kilowatts. Not only does Example 2 require less power, Example 2 provides for a higher purity in several products compared to Example 1. For example, the Example 2 ethane product recovered from the first dividing wall column first reflux drum bottoms (FIG. 1, 156) is 90.36 mol % compared to the Example 1 ethane product recovered from the deethanizer reflux drum bottoms of 83.64 mol %. Also for example, the Example 2 propane product recovered from the second dividing wall column second reflux drum bottoms (FIG. 1, 189) is 99.97 mol % compared to the Example 1 propane product recovered from the depropanizer reflux drum bottoms of 99.75 mol %. Also for example, the Example 2 butane product recovered as the third intermediate from the second dividing wall column (FIG. 1, 190) is 41.03 mol % isobutane and 58.01 mol % normal butane (99.04 mol % total butane) compared to the Example 1 butane product recovered from the debutanizer reflux drum bottoms of 38.24 mol % isobutane and 60.56 mol % normal butane (98.80 mol % total butane). Also for example, the Example 2 product recovered as the second bottoms from the second dividing wall column including one or more hydrocarbons having five or more carbon atoms per molecule (FIG. 1, 192) is 36.98 mol % isopentane and 25.60 mol % normal pentane (62.58 mol % total pentane) compared to the Example 1 debutanizer bottoms including one or more hydrocarbons having five or more carbon atoms per molecule of 36.08 mol % isopentane and 27.09 mol % normal pentane (63.17 mol % total pentane).

Embodiments discussed and described herein further relate to any one or more of the following paragraphs:

1. A method for separating hydrocarbons, comprising: introducing a hydrocarbon fluid to a first dividing wall column; recovering a first overhead comprising methane, ethane, or a combination thereof, a first intermediate comprising ethane, a second intermediate comprising ethane, and a first bottoms comprising one or more hydrocarbons having three or more carbon atoms per molecule from the first dividing wall column; introducing the first overhead to a process for producing a liquefied natural gas; introducing the first bottoms to a second dividing wall column; recovering a second overhead comprising propane, a third intermediate comprising butane, and a second bottoms comprising one or more hydrocarbons having five or more carbon atoms per molecule from the second dividing wall column; and introducing the second overhead to the process for producing a liquefied natural gas.

2. The method of paragraph 1, further comprising introducing a hydrocarbon feed comprising methane to a fractionation column; recovering a fractionation column overhead comprising methane; recovering a fractionation column bottoms comprising the hydrocarbon fluid; and introducing the fractionation column overhead to the process for producing a liquefied natural gas.

3. The method of paragraph 1 or 2, further comprising introducing the second intermediate to the process for producing a liquefied natural gas.

4. The method according to any one of paragraphs 1 to 3, wherein the method is conducted offshore.

5. A method for separating hydrocarbons, comprising: introducing a hydrocarbon fluid to a first dividing wall column; recovering a first overhead comprising methane, a first intermediate comprising one or more hydrocarbons having two to four carbon atoms per molecule, a second intermediate comprising one or more hydrocarbons having two to four carbon atoms per molecule, and a first bottoms comprising one or more hydrocarbons having five or more carbon atoms per molecule from the first dividing wall column; introducing the first overhead to a process for producing a liquefied natural gas; introducing the second intermediate to a second dividing wall column; recovering a second overhead comprising ethane, a third intermediate comprising propane, and a second bottoms comprising butane from the second dividing wall column; and introducing the second overhead to the process for producing a liquefied natural gas.

6. The method of paragraph 5, further comprising introducing a hydrocarbon feed comprising methane to a fractionation column; recovering a fractionation column overhead comprising methane; recovering a fractionation column bottoms comprising the hydrocarbon fluid; and introducing the fractionation column overhead to the process for producing a liquefied natural gas.

7. The method of paragraph 5 or 6, further comprising introducing the third intermediate to the process for producing a liquefied natural gas.

8. The method according to any one of paragraphs 5 to 7, wherein the method is conducted offshore.

9. A method for separating hydrocarbons, comprising: introducing a hydrocarbon fluid to a dividing wall column; recovering an overhead comprising propane, an intermediate comprising butane, and a bottoms comprising one or more hydrocarbons having five or more carbon atoms per molecule; introducing the overhead to a process for producing a liquefied natural gas; introducing a first hydrocarbon fluid to a fractionation column; recovering a fractionation column overhead comprising methane, ethane, or a combination thereof and a fractionation column bottoms comprising the hydrocarbon fluid; and introducing the fractionation column overhead to the process for producing a liquefied natural gas.

10. The method of paragraph 9, further comprising introducing a hydrocarbon feed comprising methane to a first fractionation column; recovering a first fractionation column overhead comprising methane; recovering a first fractionation column bottoms comprising the first hydrocarbon fluid; and introducing the first fractionation column overhead to the process for producing a liquefied natural gas.

11. The method of paragraph 9 or 10, further comprising introducing the intermediate to the process for producing a liquefied natural gas.

12. The method according to any one of paragraphs 9 to 11, wherein the method is conducted offshore.

13. A method for separating hydrocarbons, comprising: introducing a hydrocarbon fluid to a first dividing wall column; recovering a first overhead comprising methane, ethane or a combination thereof, a first intermediate comprising propane, and a first bottoms comprising one or more hydrocarbons having four or more carbon atoms per molecule from the first dividing wall column; introducing the first overhead to a process for producing a liquefied natural gas; introducing the first bottoms to a second dividing wall column; recovering a second overhead comprising butane, a second intermediate comprising pentane, and a second bottoms comprising one or more hydrocarbons having six or more carbon atoms per molecule from the second dividing wall column; and introducing the second overhead to the process for producing a liquefied natural gas.

14. The method of paragraph 13, further comprising introducing a hydrocarbon feed comprising methane to a fractionation column; recovering a fractionation column overhead comprising methane; recovering a fractionation column bottoms comprising the hydrocarbon fluid; and introducing the fractionation column overhead to the process for producing a liquefied natural gas.

15. The method of paragraph 13 or 14, further comprising introducing the first intermediate to the process for producing a liquefied natural gas.

16. The method according to any one of paragraphs 13 to 15, wherein the method is conducted offshore.

17. A method for separating hydrocarbons, comprising: introducing a hydrocarbon fluid to a first dividing wall column; recovering a first overhead comprising ethane, a first intermediate comprising propane, and a first bottoms comprising one or more hydrocarbons having four or more carbon atoms per molecule from the first dividing wall column; introducing the first overhead to a process for producing a liquefied natural gas; introducing the first bottoms to a second dividing wall column; recovering a second overhead comprising butane, a second intermediate comprising pentane, and a second bottoms comprising one or more hydrocarbons having six or more carbon atoms per molecule from the second dividing wall column; and introducing the second overhead to the process for producing a liquefied natural gas.

18. The method of paragraph 17, further comprising introducing a first hydrocarbon fluid comprising methane to a fractionation column; recovering a fractionation column overhead comprising methane, ethane, or a combination thereof; recovering a fractionation column bottoms comprising the hydrocarbon fluid; introducing a hydrocarbon feed comprising methane to a first fractionation column; recovering a first fractionation column overhead comprising methane; recovering a first fractionation column bottoms comprising the first hydrocarbon fluid; and introducing the first fractionation column overhead to the process for producing a liquefied natural gas.

19. The method of paragraph 17 or 18, further comprising introducing the first intermediate to the process for producing a liquefied natural gas.

20. The method according to any one of paragraphs 17 to 19, wherein the method is conducted offshore.

21. A system for separating hydrocarbons, comprising: a first dividing wall column; a hydrocarbon fluid line for introducing a hydrocarbon fluid to the first dividing wall column; a first overhead line for recovering a first overhead comprising methane, ethane, or a combination thereof from the first dividing wall column; a first intermediate line for recovering a first intermediate comprising ethane from the first dividing wall column; a second intermediate line for recovering a second intermediate comprising ethane from the first dividing wall column; a first bottoms line for recovering a first bottoms comprising one or more hydrocarbons having three or more carbon atoms per molecule from the first dividing wall column; wherein the first overhead line is in fluid communication with a process for producing a liquefied natural gas; and further comprising a second dividing wall column, wherein the first bottoms line is in fluid communication with the second dividing wall column for introducing the first bottoms to the second dividing wall column; a second overhead line for recovering a second overhead comprising propane from the second dividing wall column; a third intermediate line for recovering a third intermediate comprising butane from the second dividing wall column; a second bottoms line for recovering a second bottoms comprising one or more hydrocarbons having five or more carbon atoms per molecule from the second dividing wall column; and wherein the second overhead line is in fluid communication with the process for producing a liquefied natural gas.

22. The system of paragraph 21, further comprising a fractionation column; a hydrocarbon feed line for introducing a hydrocarbon feed to the fractionation column; a fractionation column bottoms line in fluid communication with the first dividing wall column for introducing the fractionation column bottoms to the first dividing wall column; a fractionation column overhead line for recovering a fractionation column overhead; and wherein the fractionation column overhead line is in fluid communication with the process for producing a liquefied natural gas.

23. The system of paragraph 21 or 22, wherein the second intermediate line is in fluid communication with the process for producing a liquefied natural gas.

24. The system according to any one of paragraphs 21 to 23, wherein the system is located offshore.

25. A system for separating hydrocarbons, comprising: a first dividing wall column; a hydrocarbon fluid line for introducing a hydrocarbon fluid to the first dividing wall column; a first overhead line for recovering a first overhead comprising methane from the first dividing wall column; a first intermediate line for recovering a first intermediate comprising one or more hydrocarbons having two to four carbon atoms per molecule from the first dividing wall column; a second intermediate line for recovering a second intermediate comprising one or more hydrocarbons having two to four carbon atoms per molecule from the first dividing wall column; and a first bottoms line for recovering a first bottoms comprising one or more hydrocarbons having five or more carbon atoms per molecule from the first dividing wall column; wherein the first overhead line is in fluid communication with a process for producing a liquefied natural gas; and further comprising a second dividing wall column, wherein the first bottoms line is in fluid communication with the second dividing wall column for introducing the first bottoms to the second dividing wall column; a second overhead line for recovering a second overhead comprising ethane from the second dividing wall column; a third intermediate line for recovering a third intermediate comprising propane from the second dividing wall column; a second bottoms line for recovering a second bottoms comprising butane from the second dividing wall column; and wherein the second overhead line is in fluid communication with the process for producing a liquefied natural gas.

26. The system of paragraph 25, further comprising a fractionation column; a hydrocarbon feed line for introducing a hydrocarbon feed to the fractionation column; a fractionation column bottoms line in fluid communication with the first dividing wall column for introducing the fractionation column bottoms to the first dividing wall column; a fractionation column overhead line for recovering a fractionation column overhead; and wherein the fractionation column overhead line is in fluid communication with the process for producing a liquefied natural gas.

27. The system of paragraph 25 or 26, wherein the third intermediate line is in fluid communication with the process for producing a liquefied natural gas.

28. The system according to any one of paragraphs 25 to 27, wherein the system is located offshore.

29. A system for separating hydrocarbons, comprising: a dividing wall column; a hydrocarbon fluid line for introducing a hydrocarbon fluid to the dividing wall column; an overhead line for recovering an overhead comprising propane, an intermediate line for recovering an intermediate comprising butane; a bottoms line for recovering a bottoms comprising one or more hydrocarbons having five or more carbon atoms per molecule; and wherein the overhead line is in fluid communication with a process for producing a liquefied natural gas; and further comprising a fractionation column; a first hydrocarbon fluid line for introducing a first hydrocarbon fluid to the fractionation column; a fractionation column overhead line for recovering a fractionation column overhead comprising methane, ethane, or a combination thereof; a fractionation column bottoms line for recovering a fractionation column bottoms comprising the hydrocarbon fluid; wherein the fractionation column bottoms line is in fluid communication with the dividing wall column for introducing the fractionation column bottoms to the dividing wall column; and wherein the fractionation column overhead line is in fluid communication with the process for producing a liquefied natural gas.

30. The system of paragraph 29, further comprising a first fractionation column; a hydrocarbon feed line for introducing a hydrocarbon feed to the first fractionation column; a first fractionation column bottoms line for recovering a first fractionation column bottoms comprising the first hydrocarbon fluid; a first fractionation column overhead line for recovering a first fractionation column overhead; wherein the first fractionation column bottoms line in fluid communication with the fractionation column for introducing the first fractionation column bottoms to the fractionation column; and wherein the first fractionation column overhead line is in fluid communication with the process for producing a liquefied natural gas.

31. The system of paragraph 29 or 30, wherein the intermediate line is in fluid communication with the process for producing a liquefied natural gas.

32. The system according to any one of paragraphs 29 to 31, wherein the system is located offshore.

33. A system for separating hydrocarbons, comprising: a first dividing wall column; a hydrocarbon fluid line for introducing a hydrocarbon fluid to the first dividing wall column; a first overhead line for recovering a first overhead comprising methane, ethane, or a combination thereof from the first dividing wall column; a first intermediate line for recovering a first intermediate comprising propane from the first dividing wall column; a first bottoms line for recovering a first bottoms comprising one or more hydrocarbons having four or more carbon atoms per molecule from the first dividing wall column; wherein the first overhead line is in fluid communication with a process for producing a liquefied natural gas; and further comprising a second dividing wall column, wherein the first bottoms line is in fluid communication with the second dividing wall column for introducing the first bottoms to the second dividing wall column; a second overhead line for recovering a second overhead comprising butane from the second dividing wall column; a second intermediate line for recovering a second intermediate comprising pentane from the second dividing wall column; a second bottoms line for recovering a second bottoms comprising one or more hydrocarbons having six or more carbon atoms per molecule from the second dividing wall column; and wherein the second overhead line is in fluid communication with the process for producing a liquefied natural gas.

34. The system of paragraph 33, further comprising a fractionation column; a hydrocarbon feed line for introducing a hydrocarbon feed to the fractionation column; a fractionation column bottoms line in fluid communication with the first dividing wall column for introducing the fractionation column bottoms to the first dividing wall column; a fractionation column overhead line for recovering a fractionation column overhead; and wherein the fractionation column overhead line is in fluid communication with the process for producing a liquefied natural gas.

35. The system of paragraph 33 or 34, wherein the first intermediate line is in fluid communication with the process for producing a liquefied natural gas.

36. The system according to any one of paragraphs 33 to 35, wherein the system is located offshore.

37. A system for separating hydrocarbons, comprising: a first dividing wall column; a hydrocarbon fluid line for introducing a hydrocarbon fluid to the first dividing wall column; a first overhead line for recovering a first overhead comprising ethane from the first dividing wall column; a first intermediate line for recovering a first intermediate comprising propane from the first dividing wall column; a first bottoms line for recovering a first bottoms comprising one or more hydrocarbons having four or more carbon atoms per molecule from the first dividing wall column; wherein the first overhead line is in fluid communication with a process for producing a liquefied natural gas; and further comprising a second dividing wall column, wherein the first bottoms line is in fluid communication with the second dividing wall column for introducing the first bottoms to the second dividing wall column; a second overhead line for recovering a second overhead comprising butane from the second dividing wall column; a second intermediate line for recovering a second intermediate comprising pentane from the second dividing wall column; a second bottoms line for recovering a second bottoms comprising one or more hydrocarbons having six or more carbon atoms per molecule from the second dividing wall column; and wherein the second overhead line is in fluid communication with the process for producing a liquefied natural gas.

38. The system of paragraph 37, further comprising a fractionation column; a first hydrocarbon fluid line for introducing a first hydrocarbon fluid to the fractionation column; a fractionation column bottoms line in fluid communication with the first dividing wall column for introducing the fractionation column bottoms to the first dividing wall column; a fractionation column overhead line for recovering a fractionation column overhead; a first fractionation column; a hydrocarbon feed line for introducing a hydrocarbon feed to the first fractionation column; a first fractionation column bottoms line in fluid communication with the fractionation column for introducing the first fractionation column bottoms to the fractionation column; a first fractionation column overhead line for recovering a first fractionation column overhead; and wherein the first fractionation column overhead line is in fluid communication with the process for producing a liquefied natural gas.

39. The system of paragraph 37 or 38, wherein the first intermediate line is in fluid communication with the process for producing a liquefied natural gas.

40. The system according to any one of paragraphs 37 to 39, wherein the system is located offshore.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method for separating hydrocarbons, comprising:
   introducing a hydrocarbon feed comprising one or more hydrocarbons containing C1 to C20 carbon atoms per molecule to a first fractionation column, wherein the hydrocarbon feed comprises 80 mol % or more methane;
   recovering an overhead from the first fractionation column, wherein the primary component in the overhead from the first fractionation column is methane;
   recovering a bottoms from the first fractionation column;
   introducing the bottoms from the first fractionation column to a first dividing wall column;
   recovering an overhead from the first dividing wall column comprising methane, ethane, or a combination thereof;
   recovering a first intermediate from the first dividing wall column, wherein the first intermediate has an ethane concentration of greater than or equal to 90 mol %, and wherein at least a portion of the first intermediate is recycled to the first dividing wall column;
   recovering a second intermediate from the first dividing wall column as a product stream;
   recovering a bottoms comprising one or more hydrocarbons having three or more carbon atoms per molecule from the first dividing wall column;
   introducing the bottoms from the first dividing wall column to a second dividing wall column;
   recovering an overhead from the second dividing wall column, wherein the primary component in the overhead from the second dividing wall column is propane;
   recovering a third intermediate from the second dividing wall column, wherein the primary component in the third intermediate is butane; and
   recovering a bottoms comprising one or more hydrocarbons having five or more carbon atoms per molecule from the second dividing wall column.

2. The method of claim 1, wherein the method is conducted offshore.

3. The method of claim 1, wherein each dividing wall column comprises a stripping section, a rectification section, and at least two fractionation zones located between the stripping and rectification sections.

4. The method of claim 1, wherein each dividing wall column comprises a first and second fractionation zone, both disposed between a stripping section and a rectification section.

5. The method of claim 4, wherein the rectification section operates at a temperature, T1; the first fractionation zone operates at a temperature, T2; the second fractionation zone operates at a temperature, T3; and the stripping section operates at a temperature, T4; wherein T1, T2, T3, and T4 are not the same temperatures.

6. The method of claim 5, wherein T1 is less than T2.

7. The method of claim 6, wherein T3 is less than T4.

8. The method of claim 5, wherein T1 is less than T2, and a temperature difference between T1 and T2 is less than 30° C.

9. The method of claim 5, wherein T3 is greater than T2, and a temperature difference between T3 and T2 is more than 15° C.

10. The method of claim 1, further comprising expanding the hydrocarbon feed prior to introducing the hydrocarbon feed to the first fractionation column to provide a two phase composition.

11. The method of claim 1, further comprising vaporizing about 50 wt % or more of the hydrocarbon feed prior to introducing the hydrocarbon feed to the first fractionation column.

12. The method of claim 4, wherein introducing the bottoms from the first fractionation column to the first dividing wall column comprises apportioning the bottoms into a first portion and a second portion, and introducing the first portion to the stripping section of the first dividing wall column and the second portion to the first fractionation zone of the first dividing wall column.

13. The method of claim 9, further comprising vaporizing about 50 wt % or more of the hydrocarbon feed prior to introducing the hydrocarbon feed to the first fractionation column, and wherein introducing the bottoms from the first fractionation column to the first dividing wall column comprises apportioning the bottoms into a first portion and a second portion, and introducing the first portion to the stripping section of the first dividing wall column and the second portion to the first fractionation zone of the first dividing wall column.

* * * * *